United States Patent
Vitthaladevuni et al.

(10) Patent No.: US 10,264,566 B2
(45) Date of Patent: Apr. 16, 2019

(54) ENHANCED CONTROL CHANNEL FOR DL SUB-BAND SCHEDULING

(71) Applicant: QUALCOMM Incorporated, San Diego, CA (US)

(72) Inventors: Pavan Kumar Vitthaladevuni, San Diego, CA (US); Peter Pui Lok Ang, San Diego, CA (US); Chih Ping Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/441,167

(22) Filed: Feb. 23, 2017

(65) Prior Publication Data
US 2018/0027527 A1   Jan. 25, 2018

Related U.S. Application Data

(60) Provisional application No. 62/365,902, filed on Jul. 22, 2016.

(51) Int. Cl.
H04W 72/04    (2009.01)
H04B 7/0413   (2017.01)
(Continued)

(52) U.S. Cl.
CPC ........ *H04W 72/042* (2013.01); *H04B 7/0413* (2013.01); *H04B 7/0626* (2013.01);
(Continued)

(58) Field of Classification Search
CPC ........... H04W 72/042; H04W 72/1289; H04W 72/0446; H04W 72/0453; H04W 72/1247;
(Continued)

(56) References Cited

U.S. PATENT DOCUMENTS 8,923,143 B2   12/2014   Gorokhov et al.
9,380,544 B2   6/2016    Larsson et al.
(Continued)

FOREIGN PATENT DOCUMENTS

CN   103959878 A   7/2014

OTHER PUBLICATIONS

International Search Report and Written Opinion—PCT/US2017/042216—ISA/EPO—dated Oct. 18, 2017.
(Continued)

*Primary Examiner* — Jung Liu
(74) *Attorney, Agent, or Firm* — Loza & Loza, LLP

(57) ABSTRACT

Aspects of the present disclosure provide a scheduling entity for facilitating Multiple Input Multiple Output (MIMO) wireless communication by dynamically assigning ranks to scheduled entities for each sub-band of a slot. In some examples, the rank assigned to a particular scheduled entity may be increased or decreased between sub-bands of the slot based on the amount of scheduled user data traffic for that particular scheduled entity relative to the amount of scheduled user data traffic for other scheduled entities. The scheduling entity further schedules resources within the sub-bands of the slot based on the assigned ranks and transmits an enhanced control channel providing scheduling information indicating the scheduled resources to the scheduled entities.

60 Claims, 13 Drawing Sheets

(51) Int. Cl.
*H04B 7/06* (2006.01)
*H04L 1/00* (2006.01)
*H04W 72/12* (2009.01)
*H04L 1/18* (2006.01)
*H04L 5/00* (2006.01)

(52) U.S. Cl.
CPC .......... *H04L 1/0003* (2013.01); *H04L 1/0009* (2013.01); *H04W 72/0446* (2013.01); *H04W 72/0453* (2013.01); *H04W 72/1289* (2013.01); *H04L 1/1854* (2013.01); *H04L 5/0053* (2013.01); *H04L 5/0057* (2013.01); *H04W 72/1231* (2013.01); *H04W 72/1247* (2013.01)

(58) Field of Classification Search
CPC ............ H04W 72/1231; H04L 1/0003; H04L 1/0009; H04L 1/1854; H04L 5/0053; H04L 5/0057; H04B 7/0626; H04B 7/0413
See application file for complete search history.

(56) References Cited

U.S. PATENT DOCUMENTS

| | | | |
|---|---|---|---|
| 9,445,299 B2 | 9/2016 | Zhu et al. | |
| 2012/0057547 A1* | 3/2012 | Lohr | H04L 5/0007 370/329 |
| 2013/0033989 A1 | 2/2013 | Barbieri et al. | |
| 2013/0301554 A1* | 11/2013 | Nam | H04B 7/0452 370/329 |
| 2015/0098438 A1 | 4/2015 | Nammi et al. | |
| 2015/0334660 A1* | 11/2015 | Hsieh | H04W 52/0274 370/328 |
| 2015/0334709 A1 | 11/2015 | Ji et al. | |
| 2016/0088652 A1 | 3/2016 | Patel et al. | |
| 2017/0290040 A1* | 10/2017 | Dinan | H04W 72/1231 |
| 2017/0290046 A1* | 10/2017 | Sun | H04L 25/0202 |
| 2017/0353281 A1* | 12/2017 | Ahmadi | H04L 5/0094 |

OTHER PUBLICATIONS

3GPP TS 36.212: "3rd Generation Partnership Project; Technical Specification Group Radio Access Network; Evolved Universal Terrestrial Radio Access (E-UTRA); Multiplexing and channel coding," Release 8, V8.0.0, Sep. 2007, pp. 1-30.
Baker M., "LTE-Advanced Physical Layer", IMT-Advanced Evaluation Workshop Dec. 17-18, 2009, Beijing, 9 No. Rev-090003r1 Dec. 17, 2009 (Dec. 17, 2009), pp. 1-48.
ETSI TS 136 213 V8.8.0, LTE, Evolved Universal Terrestrial Radio Access (E-UTRA), Physical layer procedures(Oct. 2009), pp. 1-79.
Furuskog J., et al., "Field trials of LTE with 4×4 MIMO," Ericsson Review, Jan. 2010, 6 pages.

* cited by examiner

ENHANCED CONTROL CHANNEL FOR DL SUB-BAND SCHEDULING

PRIORITY CLAIM

This application claims priority to and the benefit of Provisional Patent Application No. 62/365,902 filed in the U.S. Patent and Trademark Office on Jul. 22, 2016, the entire content of which is incorporated herein by reference as if fully set forth below in its entirety and for all applicable purposes.

TECHNICAL FIELD

The technology discussed below relates generally to wireless communication systems, and more particularly, to downlink sub-band scheduling in wireless communication systems. Embodiments can provide and enable techniques for dynamically changing the rank between sub-bands of a slot.

BACKGROUND

Wireless transmissions between a base station and one or more user equipment (UE) within a cell are generally dynamically scheduled in each subframe or slot. For example, the base station may assign resources (e.g., time-frequency resources) for downlink transmissions to one or more UEs and grant the use of resources for uplink transmissions from one or more UEs. The downlink assignments and uplink grants may be provided to the UEs via a physical downlink control channel (PDCCH).

For Multiple Input Multiple Output (MIMO) communications, each UE may be assigned a rank indicating the number of layers or data streams utilized by the base station to transmit downlink data to the UE. Within a subframe or slot, the rank assigned to a UE is generally preserved between scheduled sub-bands or resource block groups of the subframe or slot. However, if the traffic in the cell is bursty, maintaining the same rank for each UE across scheduled sub-bands of a subframe or slot may result in inefficient utilization of the downlink resources.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to dynamically assigning MIMO ranks to UEs (scheduled entities) for each sub-band of a slot. For example, the base station (scheduling entity) may dynamically increase or decrease the rank assigned to a particular scheduled entity between sub-bands of the same slot based on the amount of scheduled user data traffic for that particular scheduled entity relative to the amount of scheduled user data traffic for other scheduled entities. The scheduling entity may further schedule resources within sub-bands of the slot based on the assigned ranks and transmit an enhanced control channel providing scheduling information indicating the scheduled resources to the scheduled entities.

In one aspect of the disclosure, a method of scheduling resources in a wireless communication network is disclosed. The method includes scheduling a set of one or more first resource elements within a first sub-band of a slot to a scheduled entity based on a first rank and a first set of data streams assigned to the scheduled entity. The method further includes scheduling a set of one or more second resource elements within a second sub-band of the slot to the scheduled entity based on a second rank and a second set of data streams assigned to the scheduled entity, where the first rank is different from the second rank and the first set of data streams is different from the second set of data streams. The method further includes transmitting scheduling information indicating the set of one or more first resource elements and the set of one or more second resource elements to the scheduled entity, where the scheduling information further includes stream identification information for each sub-band assigned to the scheduled entity within the slot.

Another aspect of the disclosure provides a scheduling entity in wireless communication with a set of one or more scheduled entities within a wireless communication network. The scheduling entity includes a transceiver, a memory, and a processor communicatively coupled to the transceiver and the memory. The processor is configured to schedule a set of one or more first resource elements within a first sub-band of a slot to a scheduled entity of the set of scheduled entities based on a first rank and a first set of data streams assigned to the scheduled entity, and schedule a set of one or more second resource elements within a second sub-band of the slot to the scheduled entity based on a second rank and a second set of data streams assigned to the scheduled entity, where the first rank is different from the second rank and the first set of data streams is different than the second set of data streams. The processor is further configured to transmit scheduling information indicating the set of one or more first resource elements and the set of one or more second resource elements to the scheduled entity, where the scheduling information further includes stream identification information for each sub-band assigned to the scheduled entity within the slot.

Another aspect of the disclosure provides a scheduling entity apparatus in a wireless communication network. The scheduling entity apparatus includes means for scheduling a set of one or more first resource elements within a first sub-band if a slot to a scheduled entity of a set of scheduled entities based on a first rank and a first set of data streams assigned to the scheduled entity, and means for scheduling a set of one or more second resource elements within a second sub-band of the slot to the scheduled entity based on a second rank and a second set of data streams assigned to the scheduled entity, where the first rank is different from the second rank and the first set of data streams is different than the second set of data streams. The scheduling entity apparatus further includes means for transmitting scheduling information indicating the set of one or more first resource elements and the set of one or more second resource elements to the scheduled entity, where the scheduling information further includes stream identification information for each sub-band assigned to the scheduled entity within the slot.

Another aspect of the disclosure provides a non-transitory computer-readable medium storing computer executable code. The non-transitory computer-readable medium includes code for scheduling a set of one or more first resource elements within a first sub-band of a slot to a scheduled entity based on a first rank and a first set of data streams assigned to the scheduled entity, and scheduling a set of one or more second resource elements within a second sub-band of the slot to the scheduled entity based on a second rank and a second set of data streams assigned to the scheduled entity, where the first rank is different from the second rank and the first set of data streams is different than the second set of data streams. The non-transitory computer-readable medium further includes code for transmitting scheduling information indicating the set of one or more first resource elements and the set of one or more second resource elements to the scheduled entity, where the scheduling information further includes stream identification information for each sub-band assigned to the scheduled entity within the slot.

Examples of additional aspects of the disclosure follow. In some aspects of the disclosure, the stream identification information includes first stream identification information identifying the first set of data streams and second stream identification identifying the second set of data streams. In some examples, the method further includes transmitting a physical downlink control channel including first downlink control information carrying the first stream identification information and second downlink control information carrying the second stream identification information. In other examples, the method further includes transmitting a physical downlink control channel including downlink control information to the scheduled entity, where the downlink control information includes a first field carrying the first stream identification information and a second field carrying the second stream identification information.

In some aspects of the disclosure, the method further includes receiving channel state information from the scheduled entity, and assigning the first rank based on the channel state information. In some aspects of the disclosure, the method further includes receiving modulation and coding scheme (MCS) information from the scheduled entity, where the MCS information is determined based on a maximum rank or average rank assigned to the scheduled entity across a plurality of sub-bands within the slot.

In some aspects of the disclosure, the first rank is less than the second rank when an amount of scheduled user data traffic for the scheduled entity decreases between the first sub-band and the second sub-band. In some aspects of the disclosure, the first rank is greater than the second rank when an amount of scheduled user data traffic for the scheduled entity increases relative to scheduled user data traffic amounts for other scheduled entities between the first sub-band and the second sub-band.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Radio Access Network

Figure 1:
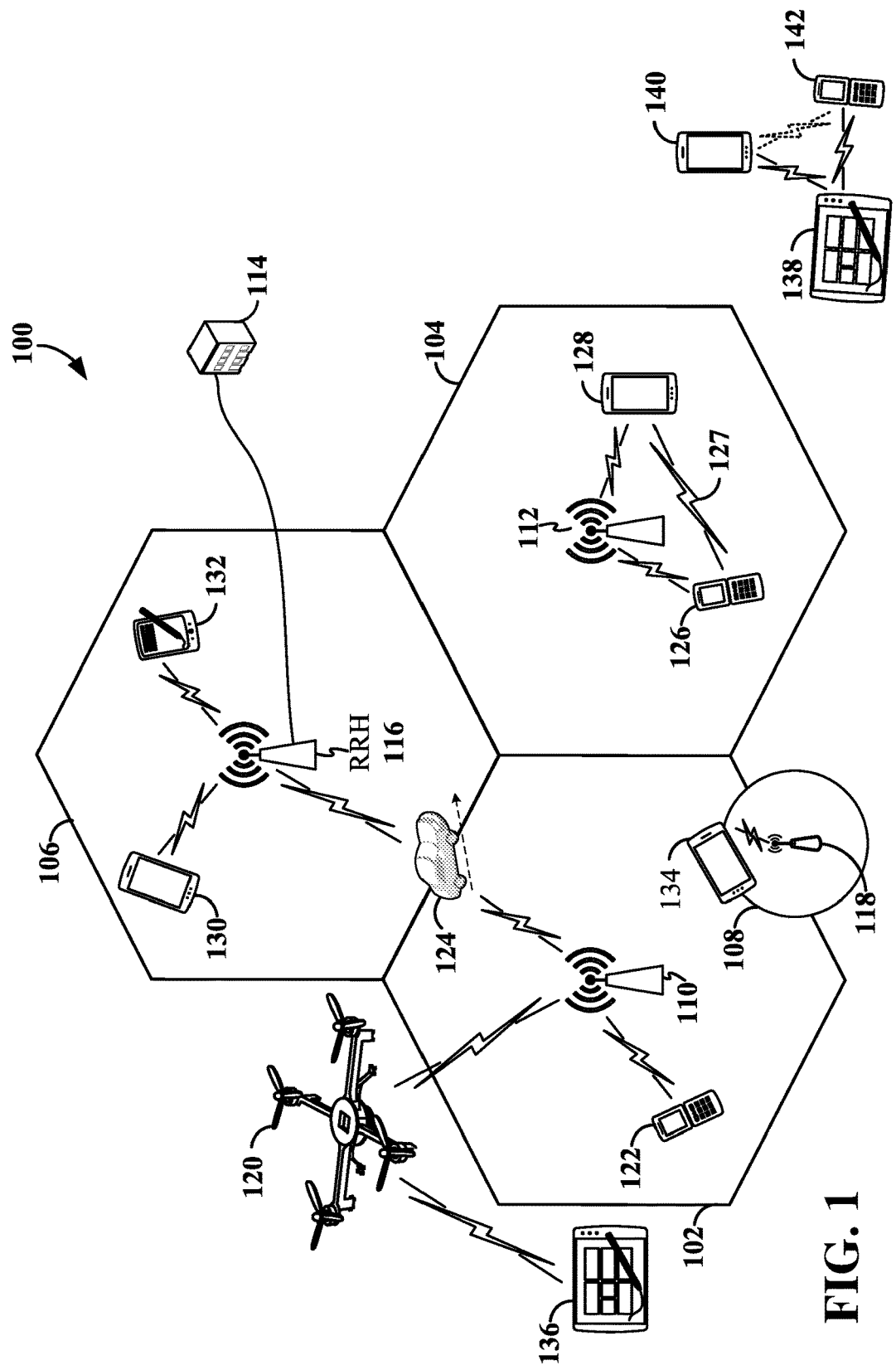
FIG. 1 is a diagram illustrating an example of an access network.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNodeB (gNB) or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
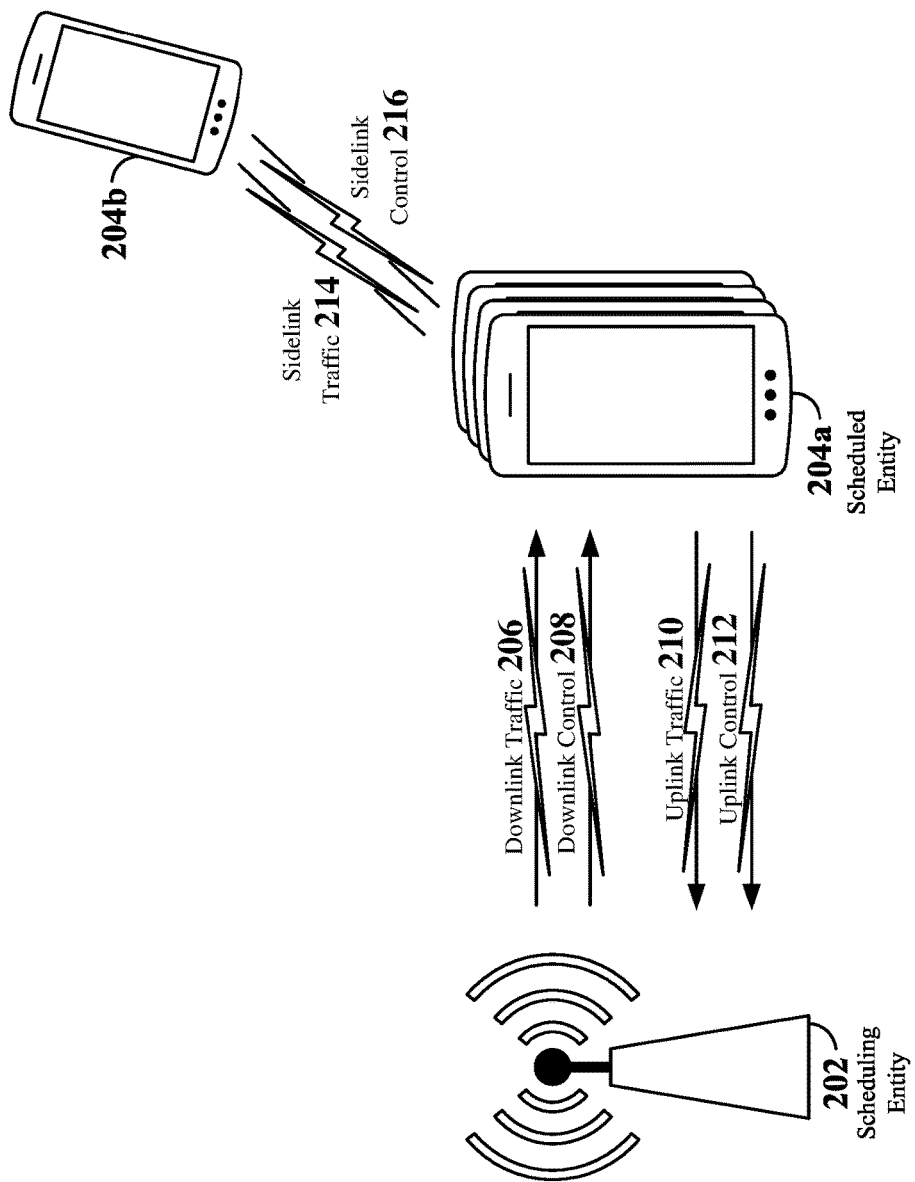
FIG. 2 is a diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast user data traffic 206 to one or more scheduled entities 204 (the user data traffic may be referred to as downlink user data traffic). In accordance with certain aspects of the present disclosure, the term downlink may refer to a point-to-multipoint transmission originating at the scheduling entity 202. Broadly, the scheduling entity 202 is a node or device responsible for scheduling user data traffic in a wireless communication network, including the downlink transmissions and, in some examples, uplink user data traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink user data traffic 210 and/or downlink user data traffic 206 including one or more traffic channels, such as a physical downlink shared channel (PDSCH) or a physical uplink shared channel (PUSCH) (and, in some examples, system information blocks (SIB s)), may additionally be transmitted between the scheduling entity 202 and the scheduled entity 204. Transmissions of the control and user data traffic information may be organized by subdividing a carrier, in time, into suitable slots.

Furthermore, the scheduled entities 204 may transmit uplink control information 212 including one or more uplink control channels (e.g., the physical uplink control channel (PUCCH)) to the scheduling entity 202. Uplink control information (UCI) transmitted within the PUCCH may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the slot for uplink packet transmissions.

Uplink and downlink transmissions may generally utilize a suitable error correcting block code. In a typical block code, an information message or sequence is split up into information blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, Walsh codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink user data traffic 214 and sidelink control 216. Sidelink control information 216 may include a source transmit signal (STS), a direction selection signal (DSS), a destination receive signal (DRS), and a physical sidelink HARQ indicator channel (PSHICH). The DSS/STS may provide for a scheduled entity 204 to request a duration of time to keep a sidelink channel available for a sidelink signal; and the DRS may provide for the scheduled entity 204 to indicate availability of the sidelink channel, e.g., for a requested duration of time. An exchange of DSS/STS and DRS (e.g., handshake) may enable different scheduled entities performing sidelink communications to negotiate the availability of the sidelink channel prior to communication of the sidelink user data traffic 214. The PSHICH may include HARQ acknowledgment information and/or a HARQ indicator from a destination device, so that the destination may acknowledge traffic received from a source device.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Resource Structure

Figure 3:
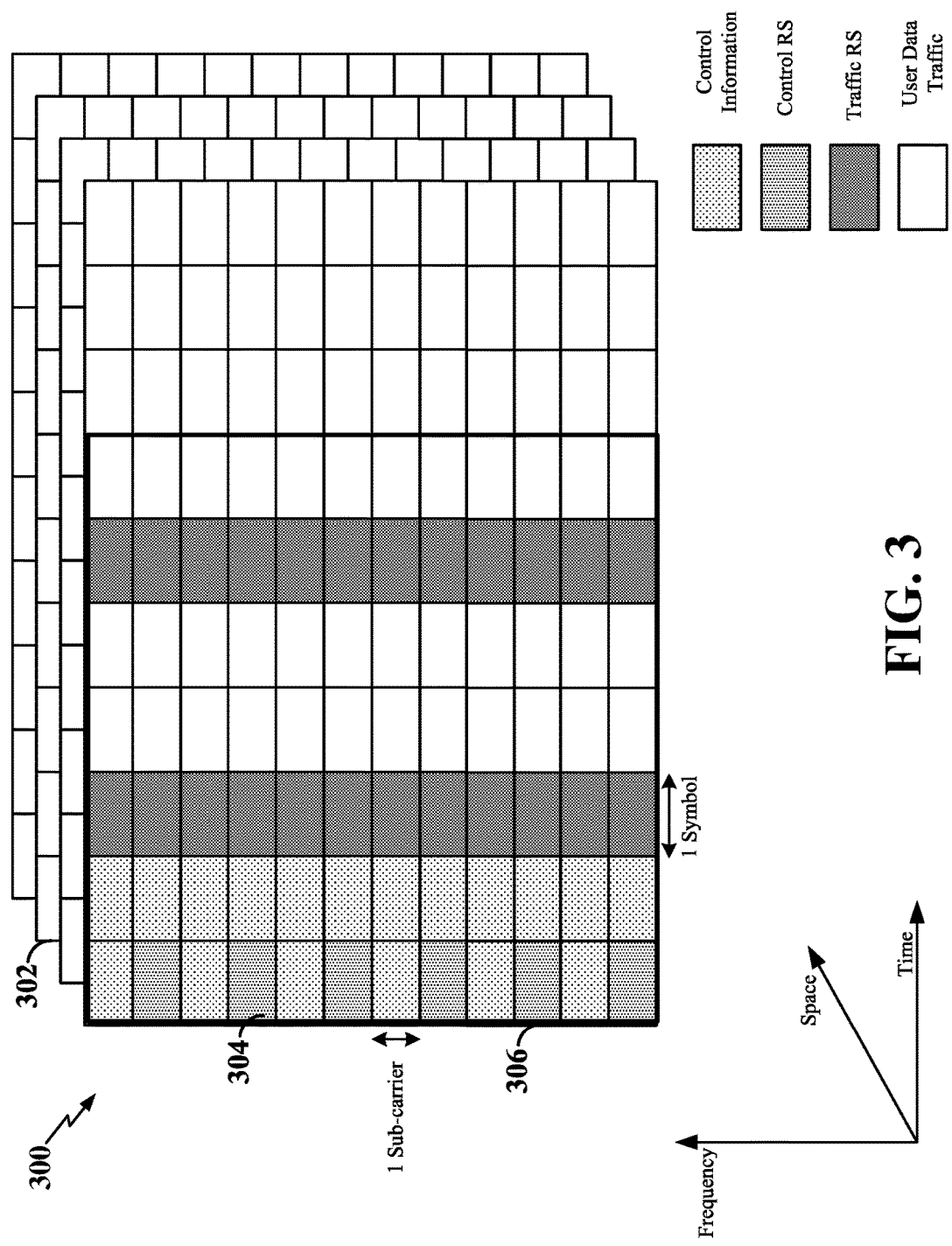
FIG. 3 is a diagram illustrating an example of a resource structure for use in an access network.

FIG. 3 is a schematic illustration of the resource structure 300 for a radio access network, such as the RAN 100 illustrated in FIG. 1. In some examples, this illustration may represent downlink wireless resources as they may be allocated in an OFDM system that utilizes MIMO.

The resources in a wireless channel may be characterized according to three dimensions: frequency, space, and time. The frequency and time dimensions of an OFDM system may be represented by a two-dimensional grid 302 of resource elements (REs) 304. The REs 304 are defined by the separation of frequency resources into closely spaced narrowband frequency tones or sub-carriers and the separation of time resources into a sequence of OFDM symbols having a given duration. In the example shown in FIG. 3, each RE 302 is represented by a rectangle having the dimensions of one sub-carrier (e.g., 15 kHz bandwidth) by one OFDM symbol. Thus, each RE 302 represents a sub-carrier modulated for the OFDM symbol period by one OFDM data symbol. Each OFDM symbol may be modulated using, for example, quadrature phase shift keying (QPSK), 16 quadrature amplitude modulation (QAM) or 64 QAM. Further, by utilizing spatial multiplexing (e.g., with MIMO), a plurality of OFDM streams are represented by separate OFDM resource grids 302 spanning in the space dimension of FIG. 3.

Any number of sub-carriers and OFDM symbols may be utilized within a subframe or slot. In some examples, the resource structure 300 shown in FIG. 3 represents a portion of a subframe or slot. The REs 304 may further be grouped into resource blocks 306. For example, in LTE networks, a resource block includes 12 consecutive sub-carriers in the frequency domain and, for a normal cyclic prefix in each OFDM symbol, 7 consecutive OFDM symbols in the time domain, or 84 resource elements. However, it should be understood that any suitable number of REs 304 may be grouped into a resource block 306.

In a given subframe or slot, transmission of one or more control channels may be followed by transmission of one or more traffic channels, in the time dimension. In general, the first N OFDM symbols in the subframe or slot typically correspond to a control region of the subframe or slot that carries control reference signals and control information, such as the Physical Control Format Indicator Channel (PCFICH), which carrier the Control Format Indicator (CFI), the Physical Hybrid Automatic Repeat Request (HARQ) Indicator Channel (PHICH), and the Physical Downlink Control Channel (PDCCH), which carries Downlink Control Information (DCI).

In the non-limiting example illustrated in FIG. 3, the first two symbols include control reference signals and control information, which may be the same as the control information 208, 212, and/or 216 described above. Accordingly, these symbols may be referred to as the control region. Any suitable region of resources in the time, frequency, and space dimensions may be utilized as a control region, not necessarily limited to the first two symbols. Moreover, a control region need not necessarily be contiguous, and may be included in one, two, or any suitable number of separate regions.

The subsequent illustrated symbols include traffic reference signals and traffic information, which may be the same as the user data traffic 206, 210, and/or 214 described above. In either a control region or a traffic region of the illustrated subframe or slot, REs that carry reference signals (RS) are interleaved with REs that carry data. These RSs can provide for channel estimation by a receiving device. For example, downlink reference signals (DL-RS) may include Cell-specific RS (CRS) for up to 4-layer spatial multiplexing in MIMO systems or Channel State Information RS (CSI-RS) for over 4-layer spatial multiplexing in MIMO systems, along with UE-specific RS (UE-RS).

A set of contiguous resource blocks may be referred to herein as a Resource Block Group (RBG) or sub-band. A set of sub-bands may span the entire downlink bandwidth. Scheduling of UEs for downlink transmissions typically involves scheduling one or more resource elements 304 within one or more sub-bands. The scheduling entity may schedule resource elements dynamically each subframe or slot based on channel state information provided by the scheduled entity indicating the quality of the downlink channel. The channel state information may include, for example, the channel quality indicator (CQI), preceding matrix index (PMI) and rank indicator (RI).

In some examples, the scheduled entity or UE may measure the channel quality (e.g., Signal to Interference Noise Ratio (SINR)) over the entire downlink bandwidth and provide a wideband channel quality indicator (CQI) to the scheduling entity. In other examples, the scheduled entity or UE may measure the channel quality over only the sub-bands for which the scheduled entity has scheduled data and provide respective CQI values for each scheduled sub-band to the scheduling entity. The CQI may include, for example, a modulation and coding scheme (MCS) index that indicates the highest modulation and code rate at which the block error rate (BLER) of the channel being analyzed does not exceed 10%. In some examples, the sub-band CQI values may be determined by combining the channel quality measurements (SINR) across layers (e.g., data streams in MIMO systems) and resource blocks to derive a total MCS index, which may then be normalized by the number of layers, with the resulting MCS index being fed back to the scheduling entity.

MIMO System

Figure 4:
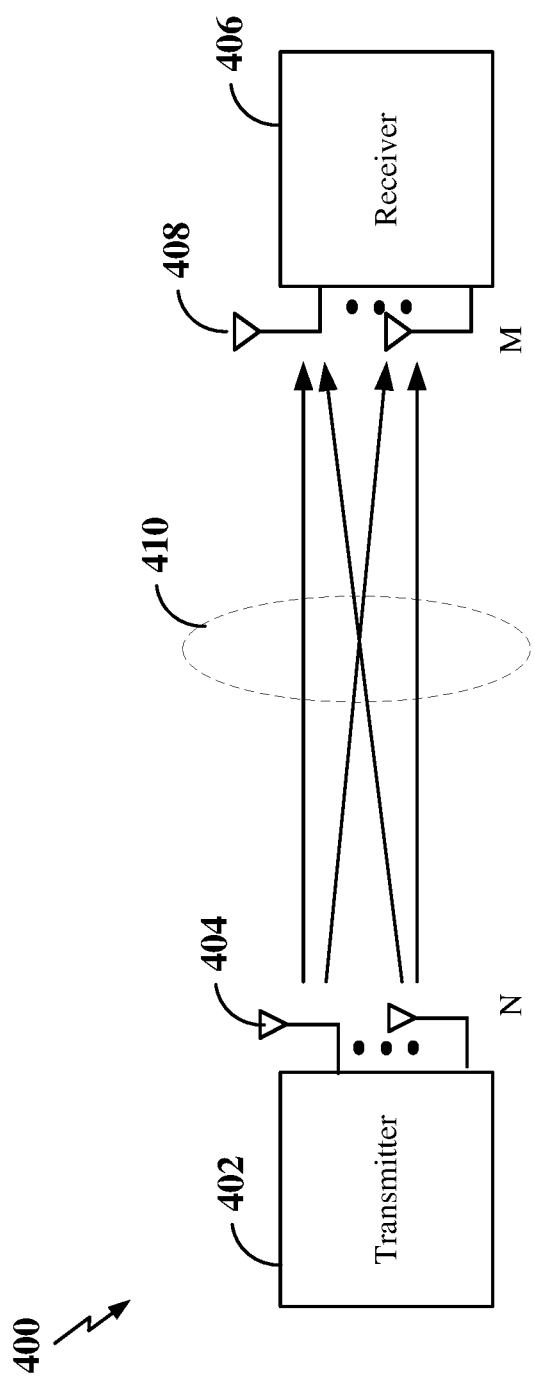
FIG. 4 is a diagram illustrating an example of a wireless communication system supporting Multiple Input Multiple Output (MIMO) technology.

FIG. 4 illustrates an example of a wireless communication system 400 supporting MIMO technology. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduled entity, a scheduling entity or other wireless communication device.

The use of MIMO technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single scheduled entity or UE to increase the data rate or to multiple scheduled entities or UEs to increase the overall system capacity, the latter being referred to as multi-user MIMO (MU-MIMO). This is achieved by spatially precoding each data stream (i.e., applying a scaling of an amplitude and a phase) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each scheduled entity or UE transmits a spatially precoded data stream, which enables the scheduling entity to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the scheduled entity, as well as other considerations, such as the available resources at the scheduling entity, may also affect the transmission rank. For example, the rank (and therefore, the number of data streams) assigned to a particular scheduled entity on the downlink may be determined based on the rank indicator (RI) transmitted from the scheduled entity to the scheduling entity. The RI may be determined based on the antenna configuration (e.g., the number of transmit and receive antennas) and the SINR on each of the receive antennas. The RI may indicate, for example, the number of layers that may be supported under the current channel conditions. The scheduling entity may use the RI, along with resource information (e.g., the available resources and amount of data to be scheduled for the scheduled entity), to assign a transmission rank to the scheduled entity.

In Time Division Duplex (TDD) systems, the uplink and downlink are reciprocal in that each uses different time slots of the same frequency bandwidth. As such, in TDD systems, the scheduling entity may assign the rank based on uplink SINR measurements (e.g., based on a Sounding Reference Signal (SRS) transmitted from the scheduled entity or other pilot signal). Based on the assigned rank, the scheduling entity may then transmit the CSI-RS with separate C-RS sequences for each layer to provide for multi-layer channel estimation. From the CSI-RS, the scheduled entity may measure the channel quality across layers and resource blocks and feed-back the CQI and RI values to the scheduling entity for use in updating the rank and assigning resource elements for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

With the introduction of massive MIMO (e.g., up to hundreds of transmit antennas at the scheduling entity or eNB) in next generation (5G) wireless systems, significant gains in data rates and link reliability may be achieved by using more antennas at the scheduling entity to focus downlink transmissions towards scheduled entities. In the detailed description that follows, various aspects of an access network will be described with reference to a MIMO system supporting MU-MIMO and/or massive MIMO.

Sub-Band Scheduling

Figure 5:
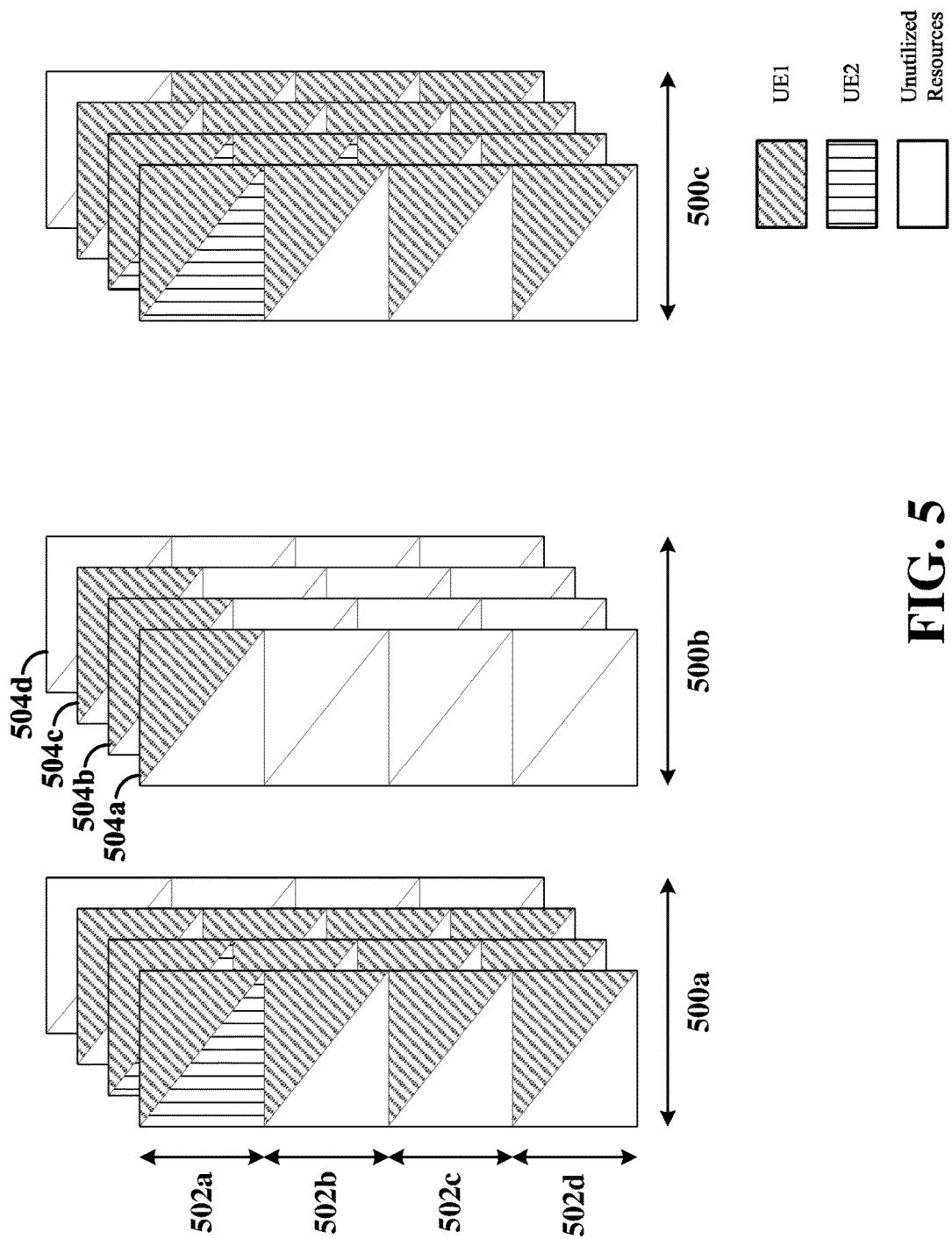
FIG. 5 is a diagram illustrating an example of sub-band scheduling based on data streams.

FIG. 5 illustrates an example of sub-band assignments based on data streams. In the example shown in FIG. 5, three subframes or slots 500a, 500b and 500c are illustrated, and each may include four sub-bands 502a-502d, for simplicity. Each subframe or slot 500a, 500b and 500c, referred to herein for simplicity as slots, may carry downlink data from a scheduling entity or eNB to two or more scheduled entities or UEs. Each slot 500a, 500b, and 500c may further be transmitted at a different time on a Time Division Duplex (TDD) carrier or a Frequency Division Duplex (FDD) carrier. Each sub-band 502a-502d includes a set of contiguous resource blocks, each including a plurality of resource elements. Each sub-band 502a-520d may carry two or more MU-MIMO data streams, with four data streams 504a-504d being illustrated in FIG. 5, depending on the number of transmit antennas at the scheduling entity and receive antennas at the scheduled entities For example, if there are two scheduled entities (UE1 and UE2), each with four receive antennas, in a massive MIMO cell, the scheduling entity may spatially multiplex up to four data streams 504a-504d to each of the scheduled entities (maximum rank of 4). However, based on resources available at the scheduling entity, assume the scheduling entity assigns a rank of 3 (with data streams 504a, 504b and 504c) to UE1 and a rank of 2 (with data streams 504a and 504b) to UE2. Typically, the rank assigned to each UE is preserved across sub-bands within a subframe or slot. Therefore, in each sub-band 502a-502d of, for example, slot 500a, the scheduling entity may schedule three data streams for UE1 and two data streams for UE2.

In the example shown in FIG. 5, within sub-band 502a of slot 500a, the scheduling entity spatially multiplexes three data streams 504a-504c to UE1 and two data streams 504a and 504b to UE2. However, in sub-band 502b of slot 500a, if there is no new user data traffic to be transmitted to UE2, the scheduling entity still spatially multiplexes three data streams 504a-504c to UE1, but no data streams to UE2. This results in underutilization of the resources available in sub-bands 502b, 502c and 502d of slot 500a and may unnecessarily delay transmission of UE1's data into the next slot 500b, as shown in sub-band 502a of slot 500b.

In various aspects of the disclosure, to more efficiently utilize the resources in each sub-band, the scheduling entity may dynamically assign ranks to scheduled entities for each sub-band. For example, the scheduling entity may dynamically increase or decrease the rank assigned to a particular scheduled entity based on the amount of scheduled user data traffic (e.g., user data traffic to be transmitted) for that particular scheduled entity relative to the amount of scheduled user data traffic for other scheduled entities. In the example shown in FIG. 5, in slot 500c, assume the scheduling entity has again assigned a rank of 3 to UE1 and a rank of 2 to UE2 and spatially multiplexes three data streams 504a-504c to UE1 and two data streams 504a and 504b to UE2 in sub-band 502a. However, in sub-band 502b of slot 500c, if there is no additional user data traffic to be transmitted to UE2, the scheduling entity may dynamically increase the rank assigned to UE1 to 4 to spatially multiplex four data streams 504a-504d to UE1. The scheduling entity may maintain the rank of 4 for UE1 for the remaining sub-bands 502c and 502d as long as there is scheduled user data traffic for UE1 and no scheduled user data traffic for UE2.

Scheduling Entity

Figure 6:
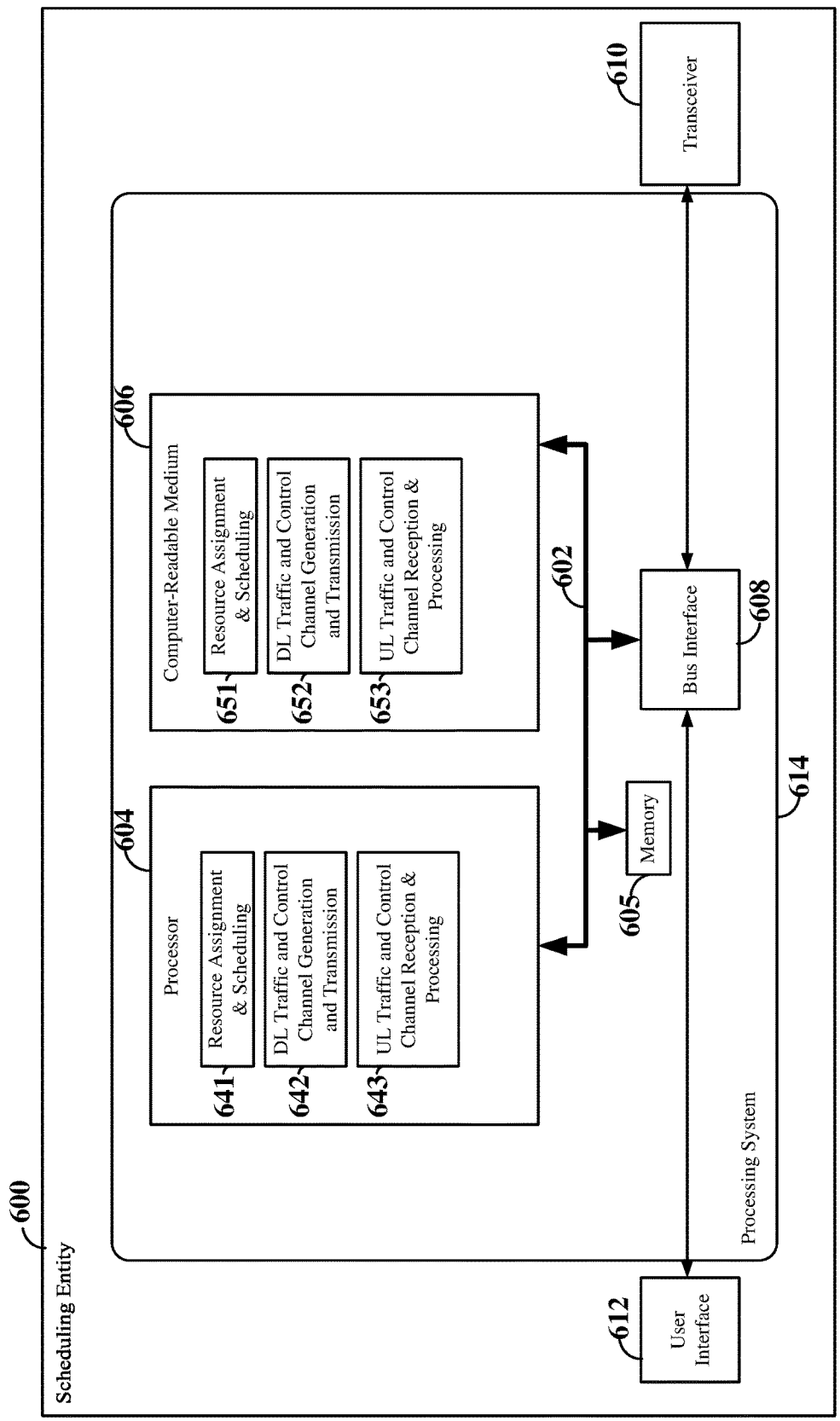
FIG. 6 is a block diagram illustrating an example of a hardware implementation for a scheduling entity employing a processing system according to some embodiments.

FIG. 6 is a conceptual diagram illustrating an example of a hardware implementation for an exemplary scheduling entity 600 employing a processing system 614. For example, the scheduling entity 600 may be a user equipment (UE) as illustrated in any one or more of FIGS. 1 and 2. In another example, the scheduling entity 600 may be a base station as illustrated in any one or more of FIGS. 1 and 2. For example, the scheduling entity 600 may be a next generation (5G) scheduling entity serving a MU-MIMO or massive MIMO cell.

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein. That is, the processor 604, as utilized in a scheduling entity 600, may be used to implement any one or more of the processes described below.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 604 may include circuitry configured for various functions. For example, the processor 604 may include resource assignment and scheduling circuitry 641, configured to generate, schedule, and modify a resource assignment or grant of time-frequency resources. For example, the resource assignment and scheduling circuitry 641 may schedule time-frequency resources within a plurality of sub-bands of one or more time division duplex (TDD) and/or frequency division duplex (FDD) subframes or slots to carry user data traffic and/or control information to and/or from multiple scheduled entities.

The resource assignment and scheduling circuitry 641 may further receive channel state information for respective downlink channels between the scheduling entity 600 and each of the scheduled entities and assign a rank to each of the scheduled entities based on the channel state information. In some examples, the channel state information received from a scheduled entity may include a channel quality indicator (CQI), precoding matrix index (PMI) and rank indicator (RI). The CQI may include a wideband CQI value and/or multiple sub-band CQI values, each including modulation and coding scheme (MCS) information (e.g., an MCS index).

The resource assignment and scheduling circuitry 641 may select a modulation and coding scheme (MCS) and precoding matrix for downlink transmissions to each scheduled entity based on the respective CQI and PMI and assign a rank to each scheduled entity based on the respective RI (and other factors, such as the number of available resources). Using the MCS, precoding matrix and rank, the resource assignment and scheduling circuitry 641 may schedule time-frequency resources (e.g., resource elements) within one or more sub-bands of a subframe or slot for one or more of the scheduled entities.

In some examples, the resource assignment and scheduling circuitry 641 may schedule a number of data streams (corresponding to the rank) to be spatially multiplexed to a scheduled entity in one or more sub-bands of a subframe or slot. In various aspects of the disclosure, the resource assignment and scheduling circuitry 641 may dynamically modify the rank (and therefore, the number of data streams) between sub-bands of the same subframe or slot based on the amount of scheduled user data traffic for the scheduled entity. In some examples, the resource assignment and scheduling circuitry 641 may determine an amount of user data traffic in a transmit buffer (e.g., in memory 605) to be transmitted to the scheduled entity and other scheduled entities and adjust the rank of the scheduled entity in one or more sub-bands of the subframe or slot based on the transmit buffer contents.

For example, the resource assignment and scheduling circuitry 641 may schedule resource elements of a first sub-band within a subframe or slot to a scheduled entity based on a first rank and corresponding number of data streams assigned to the scheduled entity for the first sub-band. The resource assignment and scheduling circuitry 641 may then schedule resource elements of a second sub-band within the same subframe or slot to the scheduled entity based on a second rank and corresponding number of data streams assigned to the scheduled entity for the second sub-band. The first rank may differ from the second rank based on the amount of scheduled user data traffic to be transmitted to the scheduled entity relative to other scheduled entities. In some examples, the first rank may be less than the second rank when an amount of scheduled user data traffic for the scheduled entity decreases between the first sub-band and the second sub-band. In other examples, the first rank may be greater than the second rank when an amount of scheduled user data traffic for the scheduled entity increases relative to scheduled user data traffic amounts for other scheduled entities between the first sub-band and the second sub-band.

In some examples, the resource assignment and scheduling circuitry 641 may schedule a CSI-Reference Signal (CSI-RS) to be included in a downlink transmission to the scheduled entity. The CSI-RS may include separate Cell-specific Reference Signal (C-RS) sequences for each layer (data stream) assigned to the scheduled entity to enable the scheduled entity to perform multi-layer channel estimation and return the calculated CSI based on the multi-layer channel estimation. The resource assignment and scheduling circuitry 641 may then adjust the MCS, precoding matrix and rank assigned to the scheduled entity based on the received CSI.

In TDD systems, the resource assignment and scheduling circuitry 641 may further initially estimate the expected channel state information (CSI) based on uplink channel measurements (e.g., based on a Sounding Reference Signal (SRS) or other pilot signal transmitted from the scheduled entity). From the estimated CSI, the resource assignment and scheduling circuitry 641 may assign an MCS, precoding matrix and rank to the scheduled entity and schedule resources for downlink transmissions to the scheduled entity based on the assigned MCS, precoding matrix and rank. The resource assignment and scheduling circuitry 641 may then receive CSI (e.g., CQI/PMI/RI) from the scheduled entity and adjust the rank and resources assigned to the scheduled entity based on whether the received CSI matches the expected CSI. The resource assignment and scheduling circuitry 641 may operate in coordination with resource assignment and scheduling software 651.

The processor 604 may further include downlink (DL) traffic and control channel generation and transmission circuitry 642, configured to generate and transmit downlink traffic and control channels within downlink subframes or slots. The DL traffic and control channel generation and transmission circuitry 642 may operate in coordination with the resource assignment and scheduling circuitry 641 to place the DL user data traffic and/or control information onto a time division duplex (TDD) or frequency division duplex (FDD) carrier by including the DL user data traffic and/or control information within one or more sub-bands of subframes or slots in accordance with the resources assigned to the DL user data traffic and/or control information. For example, the DL traffic and control channel generation and transmission circuitry 642 may generate and transmit one or more data streams within one or more sub-bands of a subframe or slot to a scheduled entity based on the downlink resources assigned to the scheduled entity in each sub-band of the subframe or slot. In some examples, the DL traffic and control channel generation and transmission circuitry 642 may further generate and transmit a CSI-RS to the scheduled entity.

The DL traffic and control channel generation and transmission circuitry 642 may further be configured to generate and transmit scheduling information for the subframe or slot to the scheduled entity. In various aspects of the disclosure, the scheduling information may include stream identification information indicating a particular set of data streams (or number of data streams) for each sub-band allocated to the scheduled entity within the subframe or slot. For example, if a first set of streams and corresponding first rank is assigned to a scheduled entity for a first sub-band of a subframe or slot and a second set of streams and corresponding second rank is assigned to the scheduled entity for a second sub-band of the subframe or slot, the stream identification information may include first stream identification information identifying the first set of data streams and second stream identification identifying the second set of data streams. Since the number of data streams, and therefore, the set of data streams (e.g., data streams 1, 2, 3, etc.) assigned to a particular scheduled entity corresponds to the rank, identifying the set of data streams assigned to the scheduled entity necessarily indicates the rank assigned to that scheduled entity.

The DL traffic and control channel generation and transmission circuitry 642 may be further configured to generate a physical downlink control channel (PDCCH) (or Enhanced PDCCH (EPDCCH)) including downlink control information (DCI) for one or more scheduled entities. In some examples, the stream identification information may be included in the DCI. For example, a separate DCI may be included for each sub-band assigned to the scheduled entity that indicates the set of streams assigned to the scheduled entity for that sub-band. As another example, the DCI for the scheduled entity may include separate fields indicating the set of streams assigned to the scheduled entity for each sub-band in the subframe or slot.

Using the above example of first and second stream identification information, the DL traffic and control channel generation and transmission circuitry 642 may generate a PDCCH or EPDCCH including first downlink control information carrying the first stream identification information and second downlink control information carrying the second stream identification information. The DL traffic and control channel generation and transmission circuitry 642 may alternatively generate a PDCCH or EPDCCH including downlink control information for the scheduled entity, in which the downlink control information includes a first field carrying the first stream identification information and a second field carrying the second stream identification information. The DL traffic and control channel generation and transmission circuitry 642 may further operate in coordination with DL traffic and control channel generation and transmission software 652.

The processor 604 may further include uplink (UL) traffic and control channel reception and processing circuitry 643, configured to receive and process uplink control channels and uplink traffic channels from one or more scheduled entities. For example, the UL traffic and control channel reception and processing circuitry 643 may be configured to receive the CSI (e.g., CQI/PMI/RI) from a scheduled entity and provide the CSI to the resource assignment and scheduling circuitry 641 to select/adjust an MCS, precoding matrix and/or rank and schedule a next downlink transmission (e.g., downlink frame, subframe, and/or slot) to the scheduled entity based on the selected/adjusted MCS, precoding matrix and rank. In some examples, the CQI (e.g., MCS index) may be determined by the scheduled entity based on a maximum rank assigned to the scheduled entity across the sub-bands assigned to the scheduled entity within a subframe or slot. In other examples, the CQI (e.g., MCS index) may be determined by the scheduled entity based on an average rank across the sub-bands. The UL traffic and control channel reception and processing circuitry 643 may then determine the respective MCS to be used for each sub-band of a next subframe or slot including scheduled data for the scheduled entity based on the rank assigned to the scheduled entity each sub-band.

The UL traffic and control channel reception and processing circuitry 643 may further be configured to receive scheduling requests from one or more scheduled entities, the scheduling requests being configured to request a grant of time-frequency resources for uplink user data traffic transmissions. In other examples, the UL traffic and control channel reception and processing circuitry 643 may be configured to receive and process acknowledgement information (e.g., acknowledged/not acknowledged packets) from one or more scheduled entities.

In general, the UL traffic and control channel reception and processing circuitry 643 may operate in coordination with the resource assignment and scheduling circuitry 641 to schedule UL user data traffic transmissions, DL user data traffic transmissions and/or DL user data traffic retransmissions in accordance with the received UL control channel information. The UL traffic and control channel reception and processing circuitry 643 may further operate in coordination with UL traffic and control channel reception and processing software 653.

Scheduled Entity

Figure 7:
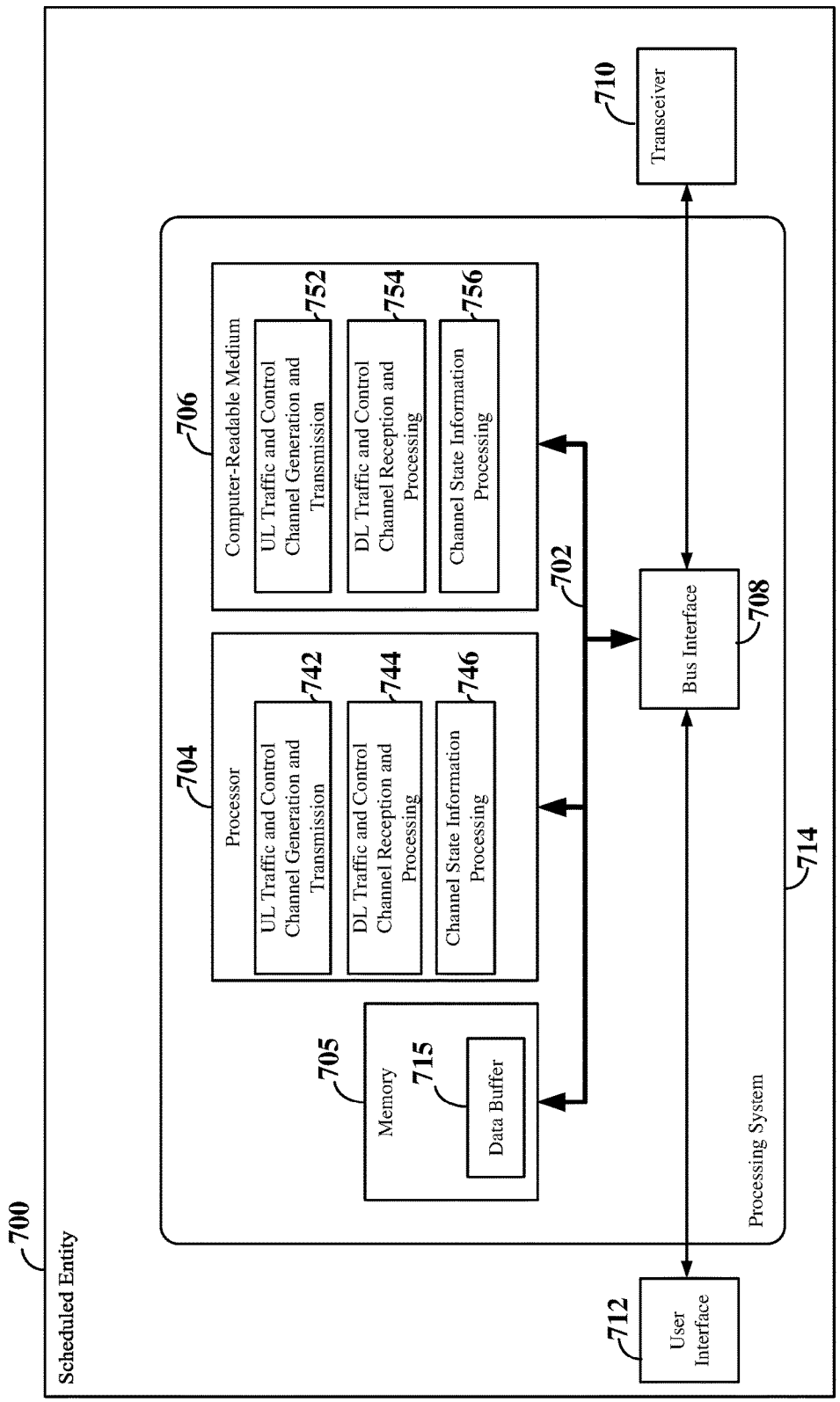
FIG. 7 is a block diagram illustrating an example of a hardware implementation for a scheduled entity employing a processing system according to some embodiments.

FIG. 7 is a conceptual diagram illustrating an example of a hardware implementation for an exemplary scheduled entity 700 employing a processing system 714. In accordance with various aspects of the disclosure, an element, or any portion of an element, or any combination of elements may be implemented with a processing system 714 that includes one or more processors 704. For example, the scheduled entity 700 may be a user equipment (UE) as illustrated in any one or more of FIGS. 1 and 2.

The processing system 714 may be substantially the same as the processing system 614 illustrated in FIG. 6, including a bus interface 708, a bus 702, memory 705, a processor 704, and a computer-readable medium 706. Furthermore, the scheduled entity 700 may include a user interface 712 and a transceiver 710 substantially similar to those described above in FIG. 6. That is, the processor 704, as utilized in a scheduled entity 700, may be used to implement any one or more of the processes described below.

In some aspects of the disclosure, the processor 704 may include uplink (UL) traffic and control channel generation and transmission circuitry 742, configured to generate and transmit uplink user data traffic on an UL traffic channel, and to generate and transmit uplink control/feedback/acknowledgement information on an UL control channel. For example, the UL traffic and control channel generation and transmission circuitry 742 may be configured to generate and transmit an uplink control channel (e.g., a Physical Uplink Control Channel (PUCCH)) including channel state information (CSI), such as channel quality information (CQI), precoding matrix index (PMI) and a rank indicator (RI). The UL traffic and control channel generation and transmission circuitry 742 may operate in coordination with UL traffic and control channel generation and transmission software 752.

The processor 704 may further include downlink (DL) traffic and control channel reception and processing circuitry 744, configured for receiving and processing downlink user data traffic on a traffic channel, and to receive and process control information on one or more downlink control channels. For example, the DL traffic and control channel reception and processing circuitry 744 may be configured to receive downlink control information (DCI) (e.g., within a PDCCH or EPDCCH) including stream identification information that indicates a particular set of data streams (or number of data streams) for each sub-band allocated to the scheduled entity within a subframe or slot. The DL traffic and control channel reception and processing circuitry 744 may then use the stream identification information to demultiplex and process a MIMO signal received via the transceiver 710. In some examples, received downlink user data traffic and/or control information may be temporarily stored in a data buffer 715 within memory 705.

The DL traffic and control channel reception and processing circuitry 744 may further receive a CSI-RS from the scheduling entity for use in measuring the channel conditions and calculating the CSI. The DL traffic and control channel reception and processing circuitry 744 may operate in coordination with DL traffic and control channel reception and processing software 754.

The processor 704 may further include channel state information (CSI) processing circuitry 746, configured to receive the CSI-RS, along with the DCI, from the DL traffic and control channel reception and processing circuitry 744 and to calculate the CSI based on the CSI-RS and DCI. For example, the CSI-RS may include separate Cell-specific Reference Signal (C-RS) sequences for each layer (data stream) assigned to the scheduled entity. Therefore, from the CSI-RS, the CSI processing circuitry 746 may perform a multi-layer channel estimation and calculate the CSI (e.g., CQI, PMI and RI) based on the multi-layer channel estimation.

For example, if the number of data streams remains constant throughout the subframe or slot, the CSI processing circuitry 746 may measure the SINR of each layer in each sub-band and then combine the SINR across layers and sub-bands to calculate a total CQI, which may then be normalized by the number of layers to derive the CQI fed back to the scheduling entity. However, if the number of data streams varies between sub-bands in the subframe or slot, the CSI processing circuitry 746 may utilize the DCI to determine the rank assigned to the scheduled entity for each sub-band within a subframe or slot and identify the maximum rank assigned to the scheduled entity for the subframe or slot. The CSI processing circuitry 746 may then calculate the total CQI (e.g., total MCS index) based on the maximum rank. For example, if the DCI indicates that the scheduled entity has a rank of 4 on sub-bands 1 and 2 and a rank of 2 on sub-bands 3 and 4, the CSI processing circuitry 746 would utilize a rank of 4 when determining the CQI (e.g., MCS index). In another aspect, the CSI processing circuitry 746 may calculate the average rank across the sub-bands, and utilize the average rank to calculate the total CQI. Using the above example, the CSI processing circuitry 746 would utilize the average rank of 3 when determining the CQI. The CSI processing circuitry 746 may operate in coordination with CSI processing software 756.

Enhanced Control Channel

Figure 8:
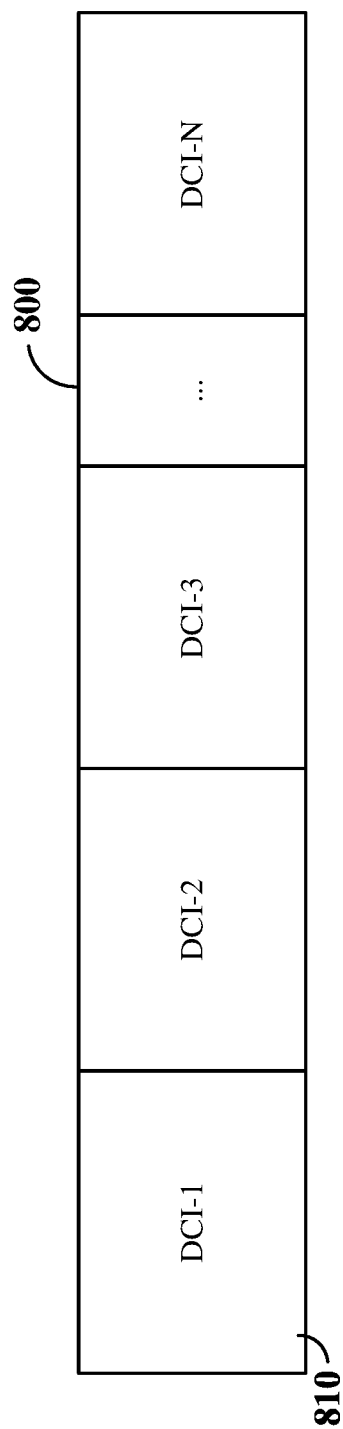
FIG. 8 is a diagram illustrating an example of a physical downlink control channel carrying stream identification information according to some embodiments.

FIG. 8 is a diagram illustrating an example of an enhanced control channel 800, such as an enhanced physical downlink control channel (EPDCCH), carrying stream identification information. The EPDCCH 800 includes a plurality of downlink channel information (DCI) 810. Each DCI 810 may include scheduling assignments (e.g., downlink assignments and/or uplink grants) for a particular scheduled entity (e.g., a UE). In the example shown in FIG. 8, the EPDCCH 800 includes multiple DCIs 810 for a single UE (UE1). For example, each DCI 810 for UE1 may include a downlink assignment and stream identification information for UE1 in a particular sub-band of the subframe or slot. Thus, DCI-1 may include a downlink assignment (e.g., assigned resource elements) and stream identification information for a first sub-band within the subframe or slot, DCI-2 may include a downlink assignment (e.g., assigned resource elements) and stream identification information for a second sub-band within the subframe or slot, and DCI-N may include a downlink assignment (e.g., assigned resource elements) and stream identification information for the $N^{th}$ sub-band within the subframe or slot. In some examples, the resource elements assigned to UE1 remain the same throughout the subframe or slot, such that each DCI 810 includes an identification of the same resource elements.

Figure 9:
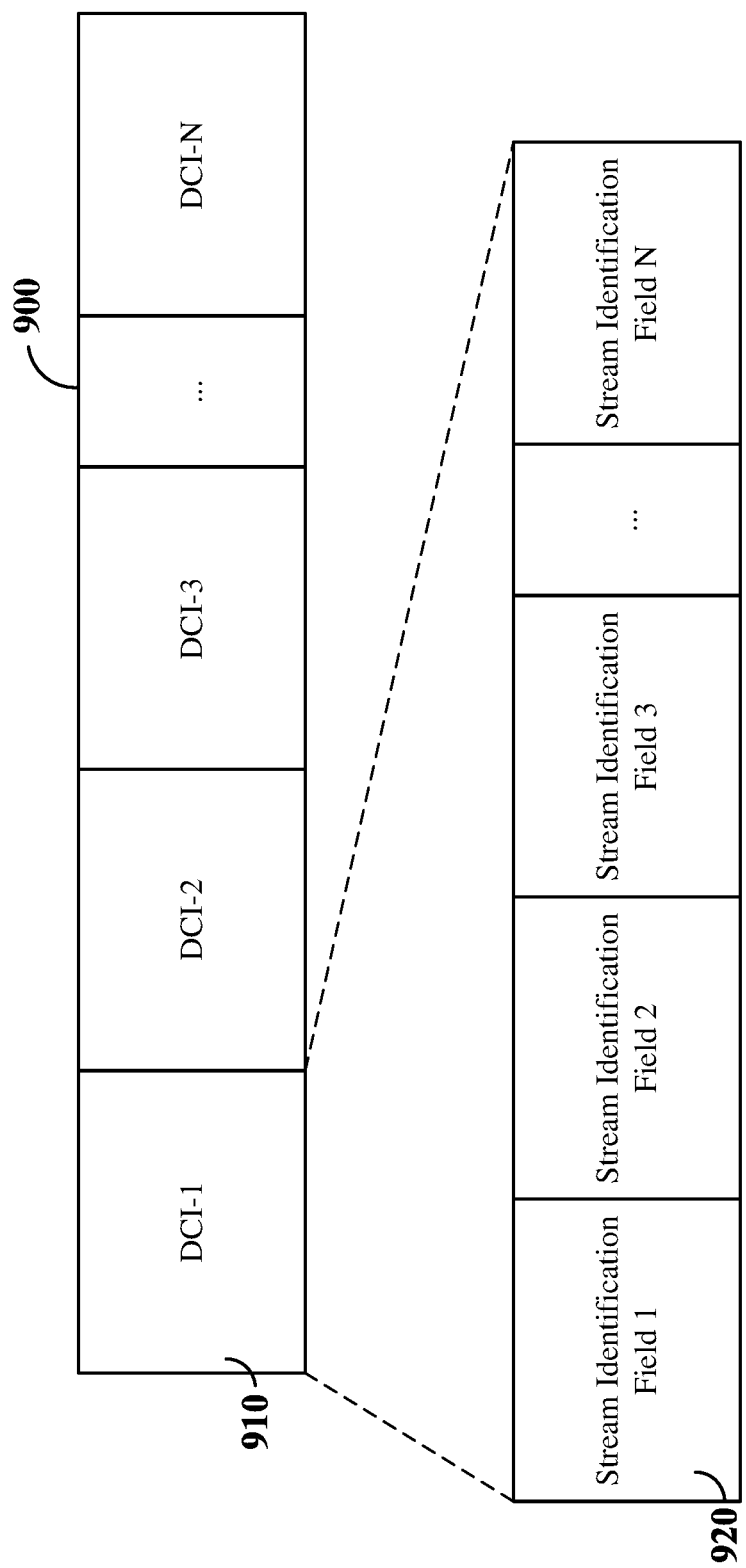
FIG. 9 is a diagram illustrating another example of a physical downlink control channel carrying stream identification information according to some embodiments.

FIG. 9 is a diagram illustrating another example of an enhanced control channel 900, such as an enhanced physical downlink control channel (EPDCCH), carrying stream identification information. The EPDCCH 900 includes a plurality of downlink channel information (DCI) 910, with each DCI carrying scheduling assignments (e.g., downlink assignments and/or uplink grants) and stream identification information for a particular scheduled entity (e.g., a UE). In the example shown in FIG. 9, each DCI 910 for a particular UE may include a separate stream identification field 920 for each sub-band of the subframe or slot. Thus, DCI-1 may include stream identification fields 1-N, each including stream identification information for a particular sub-band of the subframe or slot.

Sub-Band Scheduling Using Enhanced Control Channel

Figure 10:
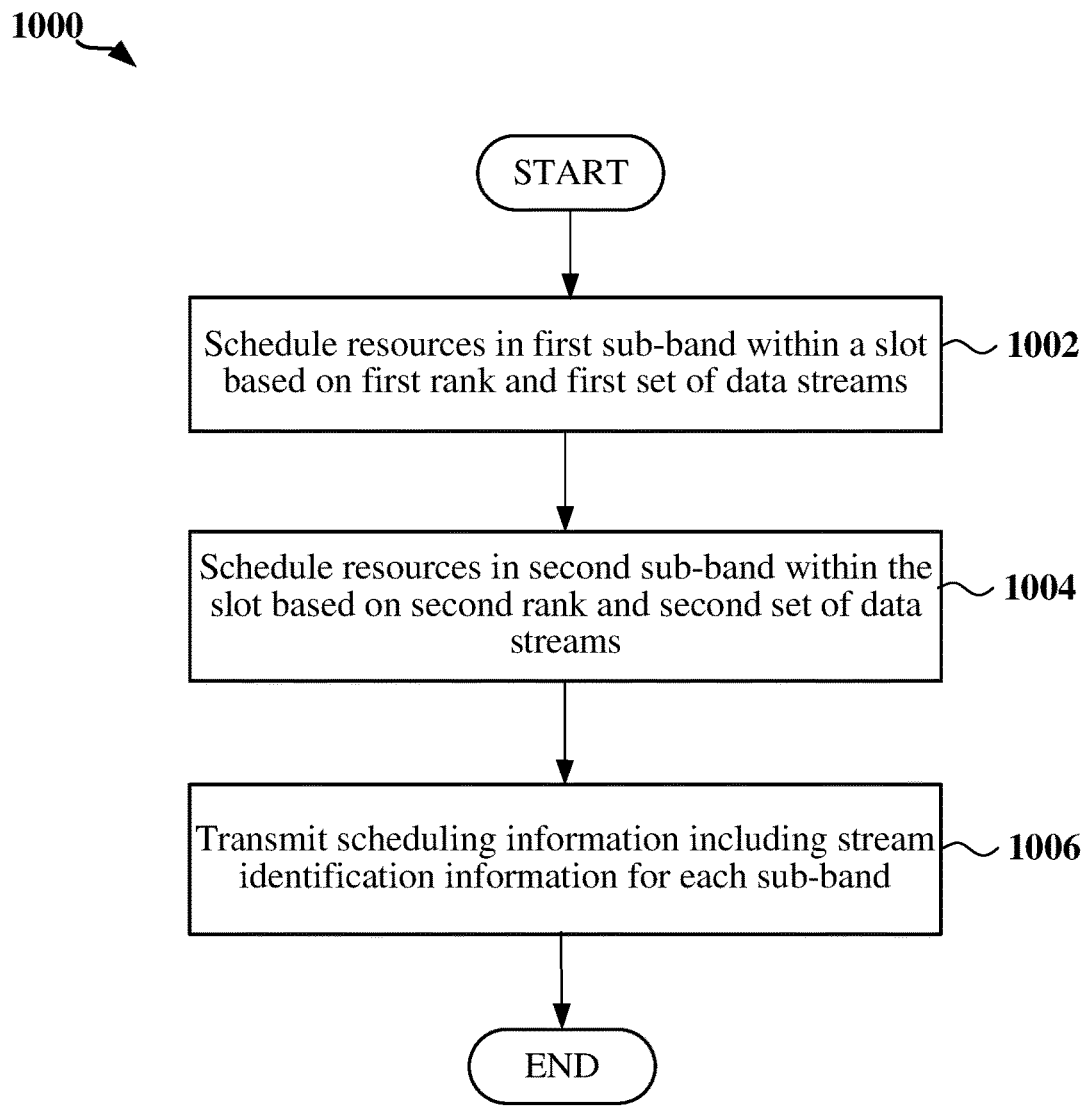
FIG. 10 is a flow chart of a method of scheduling resources in a wireless communication network according to some embodiments.

FIG. 10 is a flow chart illustrating an exemplary process 1000 for scheduling resources in a wireless communication network according to some embodiments. As described below, some or all illustrated features may be omitted in a particular implementation within the scope of the present disclosure, and some illustrated features may not be required for implementation of all embodiments. In some examples, the process 1000 may be carried out by the scheduling entity 600 illustrated in FIG. 6. In some examples, the process 1000 may be carried out by any suitable apparatus or means for carrying out the functions or algorithm described below.

At block 1002, the scheduling entity may schedule first resource elements within a first sub-band of a slot to a scheduled entity based on a first rank and a first set of data streams assigned to the scheduled entity. For example, the resource assignment and scheduling circuitry 641 shown and described above in reference to FIG. 6 may schedule the first sub-band. At block 1004, the scheduling entity may schedule second resource elements within a second sub-band of the slot to a scheduled entity based on a second rank and a second set of data streams assigned to the scheduled entity, where the first rank differs from the second rank and the first set of data streams differs from the second set of data streams. For example, the resource assignment and scheduling circuitry 641 shown and described above in reference to FIG. 6 may schedule the second sub-band.

At block 1006, the scheduling entity may generate an enhanced control channel carrying scheduling information and transmit the enhanced control channel to the scheduled entity. The scheduling information may include, for example, stream identification information for each sub-band assigned to the scheduled entity in the slot. In some examples, the scheduling entity may transmit an enhanced physical downlink control channel including downlink control information, and the stream identification information may be included in the downlink control information. For example, the DL traffic and control channel generation and transmission circuitry 642 shown and described above in reference to FIG. 6 may generate and transmit the scheduling information to the scheduled entity.

Figure 11:
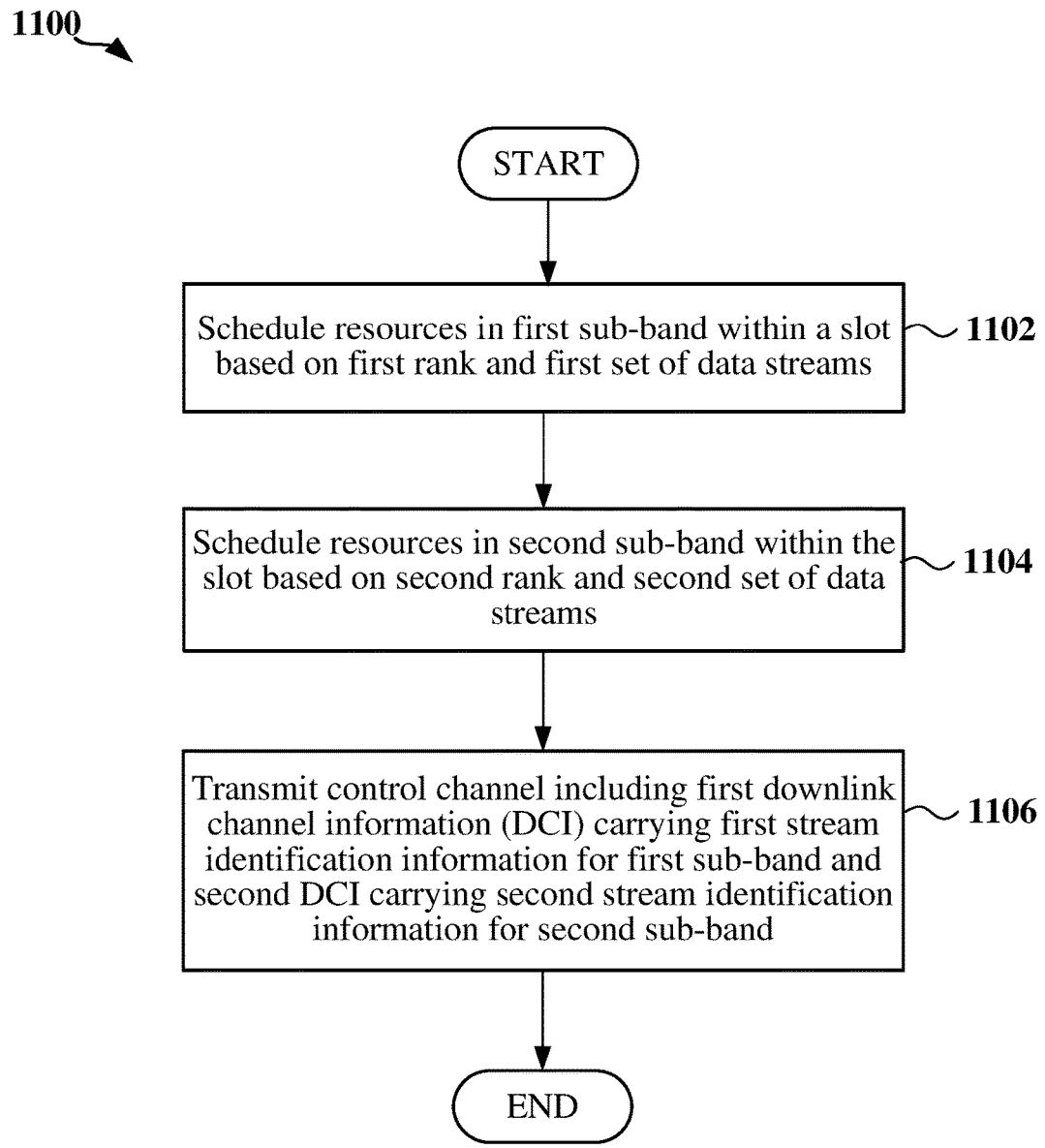
FIG. 11 is a flow chart of another method of scheduling resources in a wireless communication network according to some embodiments.

FIG. 11 is a flow chart illustrating another exemplary process 1100 for scheduling resources in a wireless communication network according to some embodiments. As described below, some or all illustrated features may be omitted in a particular implementation within the scope of the present disclosure, and some illustrated features may not be required for implementation of all embodiments. In some examples, the process 1100 may be carried out by the scheduling entity 600 illustrated in FIG. 6. In some examples, the process 1100 may be carried out by any suitable apparatus or means for carrying out the functions or algorithm described below.

At block 1102, the scheduling entity may schedule first resource elements within a first sub-band of a slot to a scheduled entity based on a first rank and a first set of data streams assigned to the scheduled entity. For example, the resource assignment and scheduling circuitry 641 shown and described above in reference to FIG. 6 may schedule the first sub-band. At block 1104, the scheduling entity may schedule second resource elements within a second sub-band of the slot to a scheduled entity based on a second rank and a second set of data streams assigned to the scheduled entity, where the first rank differs from the second rank and the first set of data streams differs from the second set of data streams. For example, the resource assignment and scheduling circuitry 641 shown and described above in reference to FIG. 6 may schedule the second sub-band.

At block 1106, the scheduling entity may generate and transmit an enhanced control channel, such as an enhanced physical downlink control channel (EPDCCH), including first downlink control information (DCI) carrying first stream identification information for the first sub-band and second DCI carrying second stream identification information for the second sub-band. The first stream identification information identifies the first set of data streams, while the second stream identification information identifies the second set of data streams. For example, the DL traffic and control channel generation and transmission circuitry 642 shown and described above in reference to FIG. 6 may generate and transmit the EPDCCH to the scheduled entity.

Figure 12:
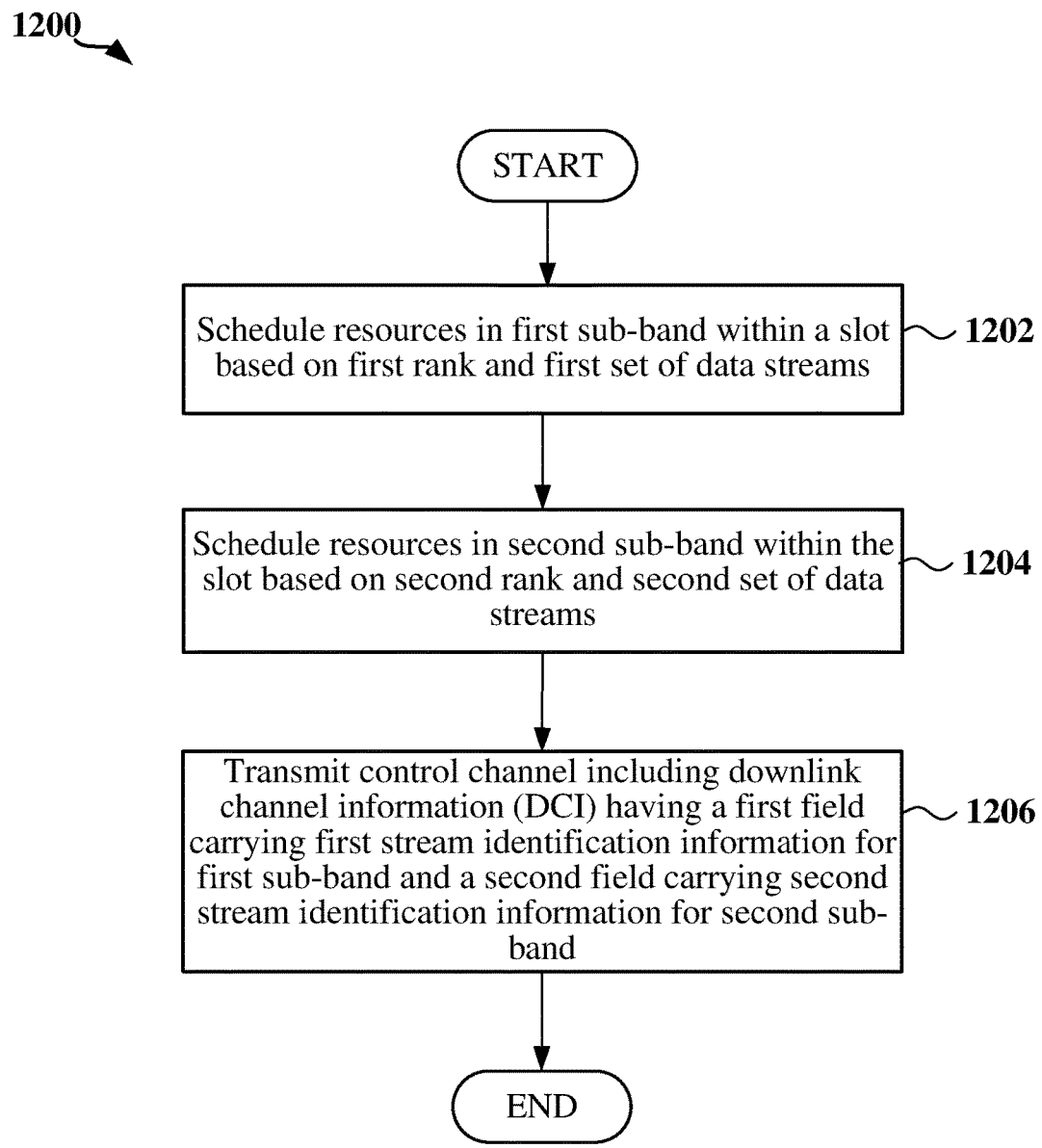
FIG. 12 is a flow chart of another method of scheduling resources in a wireless communication network according to some embodiments.

FIG. 12 is a flow chart illustrating another exemplary process 1200 for scheduling resources in a wireless communication network according to some embodiments. As described below, some or all illustrated features may be omitted in a particular implementation within the scope of the present disclosure, and some illustrated features may not be required for implementation of all embodiments. In some examples, the process 1200 may be carried out by the scheduling entity 600 illustrated in FIG. 6. In some examples, the process 1200 may be carried out by any suitable apparatus or means for carrying out the functions or algorithm described below.

At block 1202, the scheduling entity may schedule first resource elements within a first sub-band of a slot to a scheduled entity based on a first rank and a first set of data streams assigned to the scheduled entity. For example, the resource assignment and scheduling circuitry 641 shown and described above in reference to FIG. 6 may schedule the first sub-band. At block 1204, the scheduling entity may schedule second resource elements within a second sub-band of the slot to a scheduled entity based on a second rank and a second set of data streams assigned to the scheduled entity, where the first rank differs from the second rank and the first set of data streams differs from the second set of data streams. For example, the resource assignment and scheduling circuitry 641 shown and described above in reference to FIG. 6 may schedule the second sub-band.

At block 1206, the scheduling entity may generate and transmit an enhanced control channel, such as an enhanced physical downlink control channel (EPDCCH), including downlink control information (DCI) having a first field carrying first stream identification information for the first sub-band and a second field carrying second stream identification information for the second sub-band. The first stream identification information identifies the first set of data streams, while the second stream identification information identifies the second set of data streams. For example, the DL traffic and control channel generation and transmission circuitry 642 shown and described above in reference to FIG. 6 may generate and transmit the EPDCCH to the scheduled entity.

Figure 13:
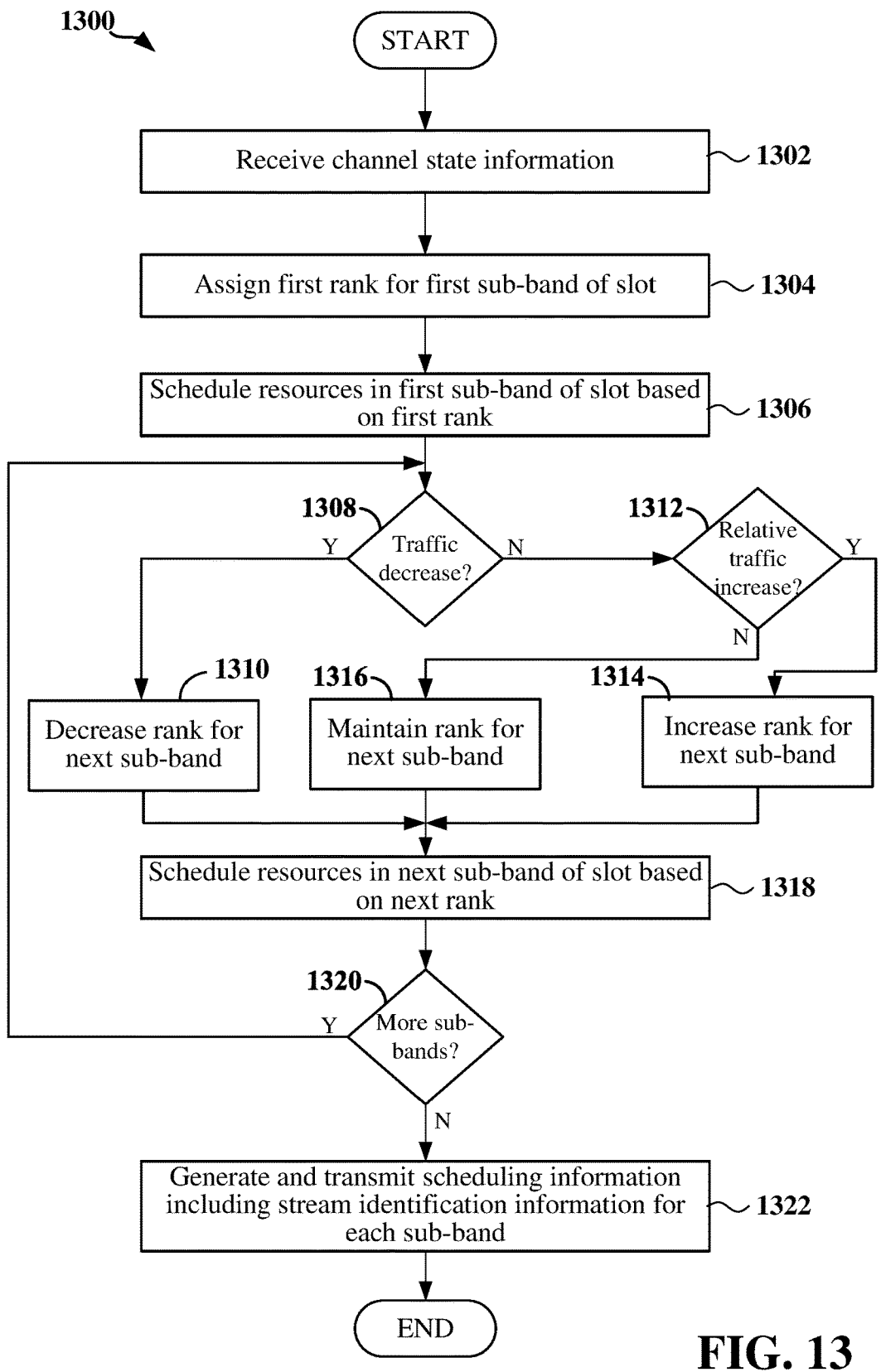
FIG. 13 is a flow chart of another method of scheduling resources in a wireless communication network according to some embodiments.

FIG. 13 is a flow chart illustrating another exemplary process 1300 for scheduling resources in a wireless communication network according to some embodiments. As described below, some or all illustrated features may be omitted in a particular implementation within the scope of the present disclosure, and some illustrated features may not be required for implementation of all embodiments. In some examples, the process 1300 may be carried out by the scheduling entity 600 illustrated in FIG. 6. In some examples, the process 1300 may be carried out by any suitable apparatus or means for carrying out the functions or algorithm described below.

At block 1302, the scheduling entity may receive channel state information (CSI) from a scheduled entity. The CSI may include, for example, the channel quality indicator (CQI), preceding matrix index (PMI) and rank indicator (RI). In some examples, the channel quality may include a wideband channel quality indicator (CQI) indicating the Signal to Interference Noise Ratio (SINR)) over the entire downlink bandwidth. In other examples, the channel quality may include multiple sub-band CQI values, each indicating the SINR for a particular sub-band. The CQI (wideband or sub-band) may include, for example, a modulation and coding scheme (MCS) index that indicates the highest modulation and code rate at which the block error rate (BLER) of the channel being analyzed does not exceed 10%. In some examples, the sub-band CQI values may be determined by combining the channel quality measurements (SINR) across layers (e.g., data streams in MIMO systems) and resource blocks of the sub-band to derive a total MCS index, which may then be normalized by the number of layers. In some examples, if the number of data streams varies between sub-bands in the slot over which the channel quality measurements are conducted, the sub-band CQI (e.g., total MCS index) may be calculated based on the maximum rank or average rank assigned to the scheduled entity during the slot. For example, the UL traffic and control channel reception and processing circuitry 643 shown and described above in reference to FIG. 6 may receive the CSI from the scheduled entity.

At block 1304, the scheduling entity may assign a first rank for a first sub-band of a slot to the scheduled entity. The first rank may be determined based on the CSI (e.g., the RI received in the CSI). At block 1306, the scheduling entity may then schedule resources in the first sub-band of the slot based on the first rank. For example, the scheduling entity may schedule resource elements of the first sub-band of the slot to the scheduled entity based on the first rank and the corresponding number of data streams assigned to the scheduled entity for the first sub-band. For example, the resource assignment and scheduling circuitry 641 shown and described above in reference to FIG. 6 may assign the first rank and schedule resources in the first sub-band of the slot based on the first rank.

At block 1308, the scheduling entity may determine whether the amount of scheduled user data traffic for the scheduled entity will decrease from the first sub-band to the second sub-band of the slot. If the amount of scheduled user data traffic for the scheduled entity will decrease (Y branch of block 1308), at block 1310, the scheduling entity may decrease the rank assigned to the scheduled entity for the second sub-band of the slot. However, if the amount of scheduled user data traffic for the scheduled entity will not decrease (N branch of block 1308), at block 1312, the scheduling entity may determine whether the amount of scheduled user data traffic for the scheduled entity will increase relative to scheduled user data traffic amounts for other scheduled entities from the first sub-band to the second sub-band. If the relative amount of scheduled user data traffic for the scheduled entity will increase (Y branch of block 1312), at block 1314, the scheduling entity may increase the rank assigned to the scheduled entity for the second sub-band of the slot. However, if the relative amount of scheduled user data traffic for the scheduled entity will not increase (N branch of block 1312), at block 1316, the scheduling entity may assign the same rank to the scheduled entity for the second sub-band of the slot. For example, the resource assignment and scheduling circuitry 641 shown and described above in reference to FIG. 6 may assign the rank to the scheduled entity for the second sub-band based on the amount of scheduled user data traffic for the scheduled entity for the second sub-band of the slot.

At block 1318, the scheduling entity may schedule resources in the second sub-band of the slot based on the rank assigned to the scheduled entity for the second sub-band. For example, the scheduling entity may schedule resource elements of the second sub-band of the slot to the scheduled entity based on the rank and the corresponding number of data streams assigned to the scheduled entity for the second sub-band. For example, the resource assignment and scheduling circuitry 641 shown and described above in reference to FIG. 6 may schedule resources in the second sub-band of the slot based on the rank.

At block 1320, the scheduling entity may determine whether there are additional sub-bands in the slot. If there are additional sub-bands in the slot (Y branch of block 1320), the process returns to block 1308, where the scheduling entity determines whether the amount of scheduled user data traffic for the scheduled entity in the next sub-band will decrease, and then assigns a rank to the scheduled entity and schedules resources for the scheduled entity in the next sub-band accordingly, as indicated in blocks 1308-1318. If there are no additional sub-bands in the slot (N branch of block 1320), at block 1322, the scheduling entity may generate and transmit scheduling information to the scheduled entity. The scheduling information may include, for example, stream identification information for each sub-band assigned to the scheduled entity in the slot. In some examples, the scheduling entity may transmit an enhanced physical downlink control channel including downlink control information, and the stream identification information may be included in the downlink control information. For example, the DL traffic and control channel generation and transmission circuitry 642 shown and described above in reference to FIG. 6 may generate and transmit the scheduling information to the scheduled entity.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 6, and/or 7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of a scheduling entity scheduling resources in a wireless communication network, the method comprising:

scheduling a set of one or more first resource elements within a first sub-band of a slot to a scheduled entity based on a first rank assigned to the scheduled entity, wherein the first rank indicates a first number of a first set of data streams to be spatially multiplexed on the set of one or more first resource elements for transmission from the scheduling entity to the scheduled entity;

scheduling a set of one or more second resource elements within a second sub-band of the slot to the scheduled entity based on a second rank assigned to the scheduled entity, wherein the second rank indicates a second number of a second set of data streams to be spatially multiplexed on the set of one or more second resource elements for transmission from the scheduling entity to the scheduled entity, wherein the first rank is different from the second rank and the first set of data streams is different than the second set of data streams; and transmitting scheduling information indicating the set of one or more first resource elements and the set of one or more second resource elements to the scheduled entity, the scheduling information further comprising stream identification information for each sub-band assigned to the scheduled entity within the slot.

2. The method of claim 1, wherein the stream identification information comprises first stream identification information identifying the first set of data streams and second stream identification information identifying the second set of data streams.

3. The method of claim 2, wherein transmitting the scheduling information to the scheduled entity further comprises:

transmitting a physical downlink control channel comprising first downlink control information carrying the first stream identification information and second downlink control information carrying the second stream identification information.

4. The method of claim 2, wherein transmitting the scheduling information to the scheduled entity further comprises:

transmitting a physical downlink control channel comprising downlink control information to the scheduled entity, the downlink control information comprising a first field carrying the first stream identification information and a second field carrying the second stream identification information.

5. The method of claim 1, further comprising:

receiving channel state information from the scheduled entity; and assigning the first rank based on the channel state information.

6. The method of claim 1, wherein the first rank is less than the second rank when an amount of scheduled user data traffic for the scheduled entity decreases between the first sub-band and the second sub-band.

7. The method of claim 1, wherein the first rank is greater than the second rank when an amount of scheduled user data traffic for the scheduled entity increases relative to scheduled user data traffic amounts for other scheduled entities between the first sub-band and the second sub-band.

8. The method of claim 1, further comprising:

receiving modulation and coding scheme (MCS) information from the scheduled entity, wherein the MCS information is determined based on a maximum rank or average rank assigned to the scheduled entity across a plurality of sub-bands within the slot.

9. A scheduling entity in wireless communication with a set of one or more scheduled entities within a wireless communication network, the scheduling entity comprising:

a transceiver;

a memory; and a processor communicatively coupled to the transceiver and the memory, the processor configured to:

schedule a set of one or more first resource elements within a first sub-band of a slot to a scheduled entity of the set of one or more scheduled entities based on a first rank assigned to the scheduled entity, wherein the first rank indicates a first number of a first set of data streams to be spatially multiplexed on the set of one or more first resource elements for transmission from the scheduling entity to the scheduled entity;

schedule a set of one or more second resource elements within a second sub-band of the slot to the scheduled entity based on a second rank assigned to the scheduled entity, wherein the second rank indicates a second number of a second set of data streams to be spatially multiplexed on the set of one or more second resource elements for transmission from the scheduling entity to the scheduled entity, wherein the first rank is different from the second rank and the first set of data streams is different than the second set of data streams; and transmit scheduling information indicating the set of one or more first resource elements and the set of one or more second resource elements to the scheduled entity, the scheduling information further comprising stream identification information for each sub-band assigned to the scheduled entity within the slot.

10. The scheduling entity of claim 9, wherein the stream identification information comprises first stream identification information identifying the first set of data streams and second stream identification information identifying the second set of data streams.

11. The scheduling entity of claim 10, wherein the processor is further configured to:

transmit a physical downlink control channel comprising first downlink control information carrying the first stream identification information and second downlink control information carrying the second stream identification information.

12. The scheduling entity of claim 10, wherein the processor is further configured to:

transmit a physical downlink control channel comprising downlink control information to the scheduled entity, the downlink control information comprising a first field carrying the first stream identification information and a second field carrying the second stream identification information.

13. The scheduling entity of claim 9, wherein the processor is further configured to:

receive channel state information from the scheduled entity; and assign the first rank based on the channel state information.

14. The scheduling entity of claim 9, wherein the first rank is less than the second rank when an amount of scheduled user data traffic for the scheduled entity decreases between the first sub-band and the second sub-band.

15. The scheduling entity of claim 9, wherein the first rank is greater than the second rank when an amount of scheduled user data traffic for the scheduled entity increases relative to scheduled user data traffic amounts for other scheduled entities between the first sub-band and the second sub-band.

16. The scheduling entity of claim 9, wherein the processor is further configured to:

receive modulation and coding scheme (MCS) information from the scheduled entity, wherein the MCS information is determined based on a maximum rank or average rank assigned to the scheduled entity across a plurality of sub-bands within the slot.

17. A scheduling entity apparatus in a wireless communication network, comprising:

first means for scheduling a set of one or more first resource elements within a first sub-band if a slot to a scheduled entity of a set of one or more scheduled entities based on a first rank assigned to the scheduled entity, wherein the first rank indicates a first number of and a first set of data streams to be spatially multiplexed on the set of one or more first resource elements for transmission from the scheduling entity apparatus to the scheduled entity;

second means for scheduling a set of one or more second resource elements within a second sub-band of the slot to the scheduled entity based on a second rank assigned to the scheduled entity, wherein the second rank indicates a second number of a second set of data streams to be spatially multiplexed on the set of one or more second resource elements for transmission from the scheduling entity apparatus to the scheduled entity, wherein the first rank is different from the second rank and the first set of data streams is different than the second set of data streams; and means for transmitting scheduling information indicating the set of one or more first resource elements and the set of one or more second resource elements to the scheduled entity, the scheduling information further comprising stream identification information for each sub-band assigned to the scheduled entity within the slot.

18. The scheduling entity apparatus of claim 17, wherein the stream identification information comprises first stream identification information identifying the first set of data streams and second stream identification information identifying the second set of data streams.

19. The scheduling entity apparatus of claim 18, wherein the means for transmitting the scheduling information to the scheduled entity further comprises:
means for transmitting a physical downlink control channel comprising first downlink control information carrying the first stream identification information and second downlink control information carrying the second stream identification information.

20. The scheduling entity apparatus of claim 18, wherein the means for transmitting the scheduling information to the scheduled entity further comprises:
means for transmitting a physical downlink control channel comprising downlink control information to the scheduled entity, the downlink control information comprising a first field carrying the first stream identification information and a second field carrying the second stream identification information.

21. The scheduling entity apparatus of claim 17, further comprising:
means for receiving channel state information from the scheduled entity; and
means for assigning the first rank based on the channel state information.

22. The scheduling entity apparatus of claim 17, wherein the first rank is less than the second rank when an amount of scheduled user data traffic for the scheduled entity decreases between the first sub-band and the second sub-band.

23. The scheduling entity apparatus of claim 17, wherein the first rank is greater than the second rank when an amount of scheduled user data traffic for the scheduled entity increases relative to scheduled user data traffic amounts for other scheduled entities between the first sub-band and the second sub-band.

24. A non-transitory computer-readable medium storing computer executable code, comprising code executable by a scheduling entity for:
scheduling a set of one or more first resource elements within a first sub-band of a slot to a scheduled entity based on a first rank assigned to the scheduled entity, wherein the first rank indicates a first number of a first set of data streams to be spatially multiplexed on the set of one or more first resource elements for transmission from the scheduling entity to the scheduled entity;

scheduling a set of one or more second resource elements within a second sub-band of the slot to the scheduled entity based on a second rank assigned to the scheduled entity, wherein the second rank indicates a second number of a second set of data streams to be spatially multiplexed on the set of one or more second resource elements for transmission from the scheduling entity to the scheduled entity, wherein the first rank is different from the second rank and the first set of data streams is different than the second set of data streams; and transmitting scheduling information indicating the set of one or more first resource elements and the set of one or more second resource elements to the scheduled entity, the scheduling information further comprising stream identification information for each sub-band assigned to the scheduled entity within the slot.

25. The non-transitory computer-readable medium of claim 24, wherein the stream identification information comprises first stream identification information identifying the first set of data streams and second stream identification information identifying the second set of data streams.

26. The non-transitory computer-readable medium of claim 25, further comprising code for:
transmitting a physical downlink control channel comprising first downlink control information carrying the first stream identification information and second downlink control information carrying the second stream identification information.

27. The non-transitory computer-readable medium of claim 25, further comprising code for:
transmitting a physical downlink control channel comprising downlink control information to the scheduled entity, the downlink control information comprising a first field carrying the first stream identification information and a second field carrying the second stream identification information.

28. The non-transitory computer-readable medium of claim 24, further comprising code for:
receiving channel state information from the scheduled entity; and
assigning the first rank based on the channel state information.

29. The non-transitory computer-readable medium of claim 24, wherein the first rank is less than the second rank when an amount of scheduled user data traffic for the scheduled entity decreases between the first sub-band and the second sub-band.

30. The non-transitory computer-readable medium of claim 24, wherein the first rank is greater than the second rank when an amount of scheduled user data traffic for the scheduled entity increases relative to scheduled user data traffic amounts for other scheduled entities between the first sub-band and the second sub-band.

31. A method of a scheduled entity communicating in a wireless communication network, the method comprising:
receiving, from a scheduling entity, scheduling information indicating a set of one or more first resource elements within a first sub-band of a slot assigned to the scheduled entity based on a first rank and a set of one or more second resource elements within a second sub-band of the slot assigned to the scheduled entity based on a second rank, the scheduling information further comprising stream identification for each sub-band assigned to the scheduled entity within the slot; and processing a multiple-input-multiple-output (MIMO) signal transmitted from the scheduling entity utilizing the stream identification information;

wherein the first rank indicates a first number of a first set of data streams of the MIMO signal spatially multiplexed on the set of one or more first resource elements;

wherein the second rank indicates a second number of a second set of data streams of the MIMO signal spatially multiplexed on the set of one or more second resource elements; and wherein the first rank is different from the second rank and the first set of data streams is different than the second set of data streams.

32. The method of claim 31, wherein the stream identification information comprises first stream identification information identifying the first set of data streams and second stream identification information identifying the second set of data streams.

33. The method of claim 32, wherein receiving the scheduling information further comprises:
receiving a physical downlink control channel comprising first downlink control information carrying the first stream identification information and second downlink control information carrying the second stream identification information.

34. The method of claim 32, wherein receiving the scheduling information further comprises:
receiving a physical downlink control channel comprising downlink control information to the scheduled entity, the downlink control information comprising a first field carrying the first stream identification information and a second field carrying the second stream identification information.

35. The method of claim 31, further comprising:
receiving a channel state information—reference signal (CSI-RS) from the scheduling entity;
calculating channel state information based on the CSI-RS and the scheduling information; and
transmitting the channel state information to the scheduling entity for use in assigning the first rank.

36. The method of claim 35, wherein the CSI-RS comprises a separate Cell-specific Reference Signal (C-RS) sequence for each data stream of the first set of data streams and the second set of data streams, and wherein calculating the channel state information further comprises:
performing a multi-layer channel estimation based on the CSI-RS; and
calculating the channel state information based on the multi-layer channel estimation.

37. The method of claim 31, wherein the first rank is less than the second rank when an amount of scheduled user data traffic for the scheduled entity decreases between the first sub-band and the second sub-band.

38. The method of claim 31, wherein the first rank is greater than the second rank when an amount of scheduled user data traffic for the scheduled entity increases relative to scheduled user data traffic amounts for other scheduled entities between the first sub-band and the second sub-band.

39. The method of claim 31, further comprising:
determining modulation and coding scheme (MCS) information based on a maximum rank assigned to the scheduled entity across a plurality of sub-bands within the slot; and transmitting the MCS information from the scheduled entity to the scheduling entity.

40. A scheduled entity in wireless communication with a scheduling entity within a wireless communication network, the scheduling entity comprising:
a transceiver;
a memory; and
a processor communicatively coupled to the transceiver and the memory, the processor configured to:
receive, from the scheduling entity via the transceiver, scheduling information indicating a set of one or more first resource elements within a first sub-band of a slot assigned to the scheduled entity based on a first rank and a set of one or more second resource elements within a second sub-band of the slot assigned to the scheduled entity based on a second rank, the scheduling information further comprising stream identification for each sub-band assigned to the scheduled entity within the slot; and
process a multiple-input-multiple-output (MIMO) signal transmitted from the scheduling entity utilizing the stream identification information;
wherein the first rank indicates a first number of a first set of data streams of the MIMO signal spatially multiplexed on the set of one or more first resource elements;
wherein the second rank indicates a second number of a second set of data streams of the MIMO signal spatially multiplexed on the set of one or more second resource elements; and
wherein the first rank is different from the second rank and the first set of data streams is different than the second set of data streams.

41. The scheduled entity of claim 40, wherein the stream identification information comprises first stream identification information identifying the first set of data streams and second stream identification information identifying the second set of data streams.

42. The scheduled entity of claim 41, wherein the processor is further configured to:
receive a physical downlink control channel comprising first downlink control information carrying the first stream identification information and second downlink control information carrying the second stream identification information.

43. The scheduled entity of claim 41, wherein the processor is further configured to:
receive a physical downlink control channel comprising downlink control information to the scheduled entity, the downlink control information comprising a first field carrying the first stream identification information and a second field carrying the second stream identification information.

44. The scheduled entity of claim 40, wherein the processor is further configured to:
receive a channel state information—reference signal (CSI-RS) from the scheduling entity;
calculate channel state information based on the CSI-RS and the scheduling information; and
transmit the channel state information to the scheduling entity for use in assigning the first rank.

45. The scheduled entity of claim 44, wherein the CSI-RS comprises a separate Cell-specific Reference Signal (C-RS) sequence for each data stream of the first set of data streams and the second set of data streams, and wherein the processor is further configured to:

perform a multi-layer channel estimation based on the CSI-RS; and calculate the channel state information based on the multi-layer channel estimation.

46. The scheduled entity of claim 40, wherein the first rank is less than the second rank when an amount of scheduled user data traffic for the scheduled entity decreases between the first sub-band and the second sub-band.

47. The scheduled entity of claim 40, wherein the first rank is greater than the second rank when an amount of scheduled user data traffic for the scheduled entity increases relative to scheduled user data traffic amounts for other scheduled entities between the first sub-band and the second sub-band.

48. The scheduled entity of claim 40, wherein the processor is further configured to:

determine modulation and coding scheme (MCS) information based on a maximum rank assigned to the scheduled entity across a plurality of sub-bands within the slot; and transmit the MCS information from the scheduled entity to the scheduling entity.

49. A scheduled entity apparatus in a wireless communication network, comprising:

means for receiving, from a scheduling entity, scheduling information indicating a set of one or more first resource elements within a first sub-band of a slot assigned to the scheduled entity based on a first rank and a set of one or more second resource elements within a second sub-band of the slot assigned to the scheduled entity based on a second rank, the scheduling information further comprising stream identification for each sub-band assigned to the scheduled entity within the slot; and means for processing a multiple-input-multiple-output (MIMO) signal transmitted from the scheduling entity utilizing the stream identification information;

wherein the first rank indicates a first number of a first set of data streams of the MIMO signal spatially multiplexed on the set of one or more first resource elements;

wherein the second rank indicates a second number of a second set of data streams of the MIMO signal spatially multiplexed on the set of one or more second resource elements; and wherein the first rank is different from the second rank and the first set of data streams is different than the second set of data streams.

50. The scheduled entity apparatus of claim 49, wherein the stream identification information comprises first stream identification information identifying the first set of data streams and second stream identification information identifying the second set of data streams.

51. The scheduled entity apparatus of claim 50, wherein the means for receiving the scheduling information further comprises:

means for receiving a physical downlink control channel comprising first downlink control information carrying the first stream identification information and second downlink control information carrying the second stream identification information.

52. The scheduled entity apparatus of claim 50, wherein the means for receiving the scheduling information further comprises:

means for receiving a physical downlink control channel comprising downlink control information to the scheduled entity, the downlink control information comprising a first field carrying the first stream identification information and a second field carrying the second stream identification information.

53. The scheduled entity apparatus of claim 49, further comprising:

means for receiving a channel state information—reference signal (CSI-RS) from the scheduling entity;

means for calculating channel state information based on the CSI-RS and the scheduling information; and means for transmitting the channel state information to the scheduling entity for use in assigning the first rank.

54. The scheduled entity apparatus of claim 53, wherein the CSI-RS comprises a separate Cell-specific Reference Signal (C-RS) sequence for each data stream of the first set of data streams and the second set of data streams, and wherein the means for calculating the channel state information further comprises:

means for performing a multi-layer channel estimation based on the CSI-RS; and means for calculating the channel state information based on the multi-layer channel estimation.

55. The scheduling entity apparatus of claim 49, further comprising:

means for determining modulation and coding scheme (MCS) information based on a maximum rank assigned to the scheduled entity across a plurality of sub-bands within the slot; and means for transmitting the MCS information from the scheduled entity to the scheduling entity.

56. A non-transitory computer-readable medium storing computer executable code, comprising code executable by a scheduling entity for:

receiving, from a scheduling entity, scheduling information indicating a set of one or more first resource elements within a first sub-band of a slot assigned to the scheduled entity based on a first rank and a set of one or more second resource elements within a second sub-band of the slot assigned to the scheduled entity based on a second rank, the scheduling information further comprising stream identification for each sub-band assigned to the scheduled entity within the slot; and processing a multiple-input-multiple-output (MIMO) signal transmitted from the scheduling entity utilizing the stream identification information;

wherein the first rank indicates a first number of a first set of data streams of the MIMO signal spatially multiplexed on the set of one or more first resource elements;

wherein the second rank indicates a second number of a second set of data streams of the MIMO signal spatially multiplexed on the set of one or more second resource elements; and wherein the first rank is different from the second rank and the first set of data streams is different than the second set of data streams.

57. The non-transitory computer-readable medium of claim 56, wherein the stream identification information comprises first stream identification information identifying the first set of data streams and second stream identification information identifying the second set of data streams.

58. The non-transitory computer-readable medium of claim 57, further comprising code for:

receiving a physical downlink control channel comprising first downlink control information carrying the first stream identification information and second downlink control information carrying the second stream identification information.

59. The non-transitory computer-readable medium of claim 57, further comprising code for:
receiving a physical downlink control channel comprising downlink control information to the scheduled entity, the downlink control information comprising a first field carrying the first stream identification information and a second field carrying the second stream identification information.

60. The non-transitory computer-readable medium of claim 56, further comprising code for:
receiving a channel state information—reference signal (CSI-RS) from the scheduling entity;
calculating channel state information based on the CSI-RS and the scheduling information; and
transmitting the channel state information to the scheduling entity for use in assigning the first rank.

* * * * *